US009510296B2

(12) United States Patent
Gao et al.

(10) Patent No.: US 9,510,296 B2
(45) Date of Patent: Nov. 29, 2016

(54) PUCCH POWER CONTROL METHOD AND DEVICE

(71) Applicant: China Academy of Telecommunications Technology, Beijing (CN)

(72) Inventors: Xuejuan Gao, Beijing (CN); Yanan Lin, Beijing (CN); Zukang Shen, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 0 days.

(21) Appl. No.: 14/760,410

(22) PCT Filed: Jan. 6, 2014

(86) PCT No.: PCT/CN2014/070141
§ 371 (c)(1),
(2) Date: Jul. 10, 2015

(87) PCT Pub. No.: WO2014/108050
PCT Pub. Date: Jul. 17, 2014

(65) Prior Publication Data
US 2015/0358918 A1    Dec. 10, 2015

(30) Foreign Application Priority Data
Jan. 11, 2013   (CN) .......................... 2013 1 0012173

(51) Int. Cl.
*H04B 7/00*   (2006.01)
*H04W 52/14*  (2009.01)
(Continued)

(52) U.S. Cl.
CPC .......... *H04W 52/146* (2013.01); *H04L 5/0048* (2013.01); *H04L 5/0055* (2013.01);
(Continued)

(58) Field of Classification Search
CPC ..... H04L 5/0048; H04L 5/0055; H04L 5/14; H04W 52/146; H04W 52/325; H04W 52/34; H04W 72/0413; H04W 72/0453

USPC ............. 455/522, 509, 450, 512, 67.11, 561, 455/158; 370/252, 336, 329; 375/259, 260
See application file for complete search history.

(56) References Cited

U.S. PATENT DOCUMENTS 9,301,183 B2 * 3/2016 Heo ................. H04W 52/0258
2004/0214591 A1 * 10/2004 Lott ..................... H04L 1/0002
455/522

(Continued)

FOREIGN PATENT DOCUMENTS

CN    102083181    6/2011
CN    102804872    11/2012
(Continued)

OTHER PUBLICATIONS

Extended European Search Report for EP Application No. 14737864.0 mailed Oct. 8, 2015.
(Continued)

*Primary Examiner* — Tan H Trinh
(74) *Attorney, Agent, or Firm* — Foley & Lardner LLP; James F. Ewing; Paul M. H. Puah

(57) ABSTRACT

Disclosed are a physical uplink control channel (PUCCH) power control method and device, which relate to the technique of communications. When a user equipment (UE) supports the transmission of a PUCCH on different uplink carriers corresponding to different carrier groups, an uplink carrier where the PUCCH is transmitted in a current uplink subframe is determined (S501); for each uplink carrier where the PUCCH is transmitted, based on a transmission power control (TPC) command received over at least one downlink carrier in at least one carrier group transmitting uplink control information (UCI) in the PUCCH on the uplink carrier in the current uplink subframe, the UE determines a power regulation cumulant corresponding to the PUCCH transmitted on the uplink carrier in the current uplink subframe (S502); and for each uplink carrier where the PUCCH is transmitted, according to a PUCCH power control parameter and the power regulation cumulant corresponding to the uplink carrier, the UE determines the transmission power of the PUCCH transmitted on the uplink carrier in the current uplink subframe (S503), thereby realizing the PUCCH power control.

18 Claims, 6 Drawing Sheets

(51) Int. Cl.
*H04W 72/04* (2009.01)
*H04L 5/00* (2006.01)
*H04L 5/14* (2006.01)
*H04W 52/32* (2009.01)
*H04W 52/34* (2009.01)

(52) U.S. Cl.
CPC .............. *H04L 5/14* (2013.01); *H04W 52/325* (2013.01); *H04W 52/34* (2013.01); *H04W 72/0413* (2013.01); *H04W 72/0453* (2013.01)

(56) References Cited

U.S. PATENT DOCUMENTS

| | | | | |
|---|---|---|---|---|
| 2007/0076807 A1* | 4/2007 | Jin | ............... | H04L 1/0025 375/260 |
| 2011/0111788 A1* | 5/2011 | Damnjanovic | ....... | H04W 52/42 455/522 |
| 2011/0310986 A1* | 12/2011 | Heo | ............... | H04L 5/001 375/259 |
| 2012/0087334 A1* | 4/2012 | Suzuki | ............... | H04L 5/001 370/329 |
| 2012/0178494 A1* | 7/2012 | Haim | ............... | H04W 52/365 455/522 |
| 2012/0208583 A1* | 8/2012 | Chung | ............... | H04L 5/001 455/509 |
| 2012/0263060 A1* | 10/2012 | Suzuki | ............... | H04W 52/365 370/252 |
| 2013/0044621 A1* | 2/2013 | Jung | ............... | H04W 72/082 370/252 |
| 2013/0083766 A1* | 4/2013 | Chung | ............... | H04W 72/0413 370/329 |
| 2013/0121271 A1* | 5/2013 | Chen | ............... | H04W 72/02 370/329 |
| 2013/0153298 A1* | 6/2013 | Pietraski | ............... | H04L 5/001 175/45 |
| 2013/0329688 A1* | 12/2013 | Yang | ............... | H04L 1/1861 370/329 |
| 2014/0023028 A1* | 1/2014 | Zhang | ............... | H04W 52/221 370/329 |
| 2014/0112280 A1* | 4/2014 | Lee | ............... | H04W 72/04 370/329 |
| 2014/0171144 A1* | 6/2014 | Kim | ............... | H04W 52/367 455/522 |
| 2014/0177584 A1* | 6/2014 | Ouchi | ............... | H04W 52/146 370/329 |
| 2014/0177601 A1* | 6/2014 | Nishio | ............... | H04W 24/10 370/332 |
| 2014/0204842 A1* | 7/2014 | Kim | ............... | H04W 52/146 370/328 |
| 2014/0321337 A1* | 10/2014 | Kim | ............... | H04L 5/0053 370/280 |
| 2014/0329555 A1* | 11/2014 | Gao | ............... | H04W 52/146 455/522 |
| 2015/0146634 A1* | 5/2015 | Hwang | ............... | H04L 5/0057 370/329 |
| 2015/0189574 A1* | 7/2015 | Ng | ............... | H04W 24/08 370/252 |
| 2015/0245347 A1* | 8/2015 | Yi | ............... | H04W 72/1289 370/280 |
| 2015/0318968 A1* | 11/2015 | Kim | ............... | H04B 7/2656 370/329 |
| 2015/0319753 A1* | 11/2015 | Chen | ............... | G01N 33/57446 370/277 |
| 2015/0326369 A1* | 11/2015 | Kim | ............... | H04L 5/0057 370/252 |
| 2015/0341865 A1* | 11/2015 | Yang | ............... | H04W 52/146 455/522 |
| 2016/0050632 A1* | 2/2016 | Falahati | ............... | H04L 5/0055 370/329 |

FOREIGN PATENT DOCUMENTS

| | | |
|---|---|---|
| EP | 2525611 | 11/2012 |
| JP | 2012531795 | 12/2012 |
| WO | WO-2012/157981 | 11/2012 |

OTHER PUBLICATIONS

'3rd Generation Partnership Project; Technical Specification Group Radio Access Network; Evolved Universal Terrestrial Radio Access (E-UTRA); Physical layer procedures (Release 11)', 3GPP Standard; 3GPP TS 36.213, $3^{rd}$ Generation Partnership Project (3GPP), Mobile Competence Centre; 650, Route Des Lucioles ; F-06921 Sophia-Antipolis Cedex, France, vol. RAN WG1, No. VII.1.0, Dec. 20, 2012 (Dec. 20, 2012), pp. 1-160, XP050691223, [retrieved on Dec. 20, 2012] *chapter 5.1.2 'Physical uplink control channel'*.
International Search Report for PCT/CN2014/070141 mailed Apr. 30, 2014.

* cited by examiner

PUCCH POWER CONTROL METHOD AND DEVICE

This application is a US National Stage of International Application No. PCT/CN2014/070141, filed on 6 Jan. 2014, designating the United States, and claiming claims the benefit of Chinese Patent Application No. 201310012173.0, filed with the State Intellectual Property Office of People's Republic of China on Jan. 11, 2013 and entitled "Method and device for controlling PUCCH power", which is hereby incorporated by reference in its entirety.

FIELD

The present invention relates to the field of communications and particularly to a method and device for controlling PUCCH power.

BACKGROUND

In the Long Term Evolution (LTE) and earlier wireless communication systems, there is only one carrier with a bandwidth up to 20 MHz in a cell as illustrated in FIG. 1. In the Long Term Evolution-Advanced (LTE-A) system, there are required peak data rates of the system, up to 1 Gbps in the downlink and 500 Mbps in the uplink, as improved significantly compared to the LTE system. The required peak data rates can not be available with only one carrier with a bandwidth up to 20 MHz. Thus the technology of Carrier Aggregation (CA) has been introduced to the LTE-A system, where a plurality of contiguous or non-contiguous carriers served by the same evolved Node B (eNB) are aggregated together to serve a User Equipment (UE) concurrently as illustrated in FIG. 2. These carriers aggregated together are referred to as Component Carriers (CCs). Each cell can correspond to one component carrier, and cells (component carriers) served by different eNBs can not be aggregated. In order to ensure backward compatibility with a UE in the LTE system, there is a bandwidth of no more than 20 MHz for each of the carriers.

One of the component carriers aggregated for the UE is defined as a Primary Component Carrier (PCC) including a downlink PCC and an uplink PCC, and the remaining component carriers are referred to as Secondary Component Carriers (SCCs).

In the LTE system, transmission of a Physical Uplink Control Channel (PUCCH) on only one component carrier (i.e., the UL PCC) is supported at present, and the transmit power of PUCCH in each subframe is determined in the equation of:

$$P_{PUCCH}(i) = \min \begin{cases} P_{CMAX,c}(i), \\ P_{0\_PUCCH} + PL_c + h(n_{CQI}, n_{HARQ}, n_{SR}) + \Delta_{F\_PUCCH}(F) + \Delta_{TxD}(F') + g(i) \end{cases} [dBm]$$

Where $P_{CMAX,c}(i)$ represents the maximum transmit power corresponding to each carrier, $\Delta_{F\_PUCCH}(F)$ represents a power offset varying with different PUCCH formats relative to the PUCCH format 1a, configured by higher layer signaling;

$\Delta_{TxD}(F')$ represents a power offset, configured by higher-layer signaling, corresponding to transmission via two antenna ports; and when the PUCCH is transmitted via only a single antenna port, $\Delta_{TxD}(F')=0$;

$h(n_{CQI}, n_{HARQ}, n_{SR})$ represents a power offset, related to carried bits, calculated in a predefined equation varying with different PUCCH formats, where $n_{CQI}$ represents the number of carried periodical Channel State Information (CSI) bits, $n_{SR}$ represents the number of carried Scheduling Request (SR) bits, and $n_{HARQ}$ represents the number of carried ACK/NACK bits;

$P_{O\_PUCCH}$ represents the sum of a cell-specific parameter $P_{O\_NOMINAL\_PUCCH}$ and a UE-specific parameter $P_{O\_UE\_PUCCH}$, configured by higher-layer signaling, and this parameter is currently configured only for the PCC; and $$g(i) = g(i-1) + \sum_{m=0}^{M-1} \delta_{PUCCH}(i-k_m)$$

represents a Transmit Power Control (TPC) command cumulative value, that is, power adjustment values indicated in TPC commands received via a plurality of Physical Downlink Control Channels (PDCCHs) corresponding to the PCC are cumulated together as a power control adjustment of the current transmission, where $g(i-1)$ represents a TPC command cumulative value of a preceding uplink subframe, and when $P_{O\_UE\_PUCCH}$ is reconfigured by higher-layer signaling, the cumulative value is reset as $g(0)=0$, and when a random access response corresponding to the PCC is received, the cumulative value is reset as $g(0)=\Delta P_{rampup}+\delta_{msg2}$, where $\delta_{msg2}$ represents a TPC indicated in the random access response, $\Delta P_{rampup}$ is provided by higher-layer and represents a total power ramp-up from the first to the last preamble transmitted on the PCC; and $\delta_{PUCCH}$ represents the power adjustment value indicated by the TPC command obtained by the UE in the PDCCH in the correspondence relationships as depicted in Table 1 and Table 2, and can be obtained in the following two categories of PDCCHs:

In a first category of PDCCH, the power adjustment value is obtained from a TPC field in a PDCCH/Enhanced PDCCH (EPDCCH), corresponding to the PCC, with the Downlink Control Information (DCI) format 1A/1B/1D/1/2A/2/2B/2C/2D and scrambled by a Cell-Radio Network Temporary Identifier (C-RNTI) or a Semi-Persistent Scheduling C-RNTI (SPS C-RNTI); and if the PDCCH is validated as SPS activation or SPS release, then $\delta_{PUCCH}=0$ dB; and In a second category of PDCCH, the power adjustment value is obtained from a PDCCH/EPDCCH, transmitted in a Common Search Space (CSS) of the PCC, with the DCI format 3/3A and scrambled by a TPC-PUCCH-RNTI. This scheme relates to a TPC multicast scheme in which TPC commands for a plurality of UEs can be transmitted in the same DCI format 3/3A, and each of the UEs obtains its corresponding TPC command from the DCI format 3/3A according to a TPC-index preconfigured by a higher layer.

TABLE 1

The correspondence relationship between the TPC command field in the DCI format 1A/1B/1D/1/2A/2/2B/2C/2D/2/3 and the value of $\delta_{PUCCH}$ indicated by the TPC command

| TPC Command Field in DCI format 1A/1B/1D/1/2A/2B/2C/2D/2/3 | $\delta_{PUCCH}$ [dB] |
|---|---|
| 0 | −1 |
| 1 | 0 |

TABLE 1-continued

The correspondence relationship between the TPC command
field in the DCI format 1A/1B/1D/1/2A/2/2B/2C/2D/2/3 and the
value of $\delta_{PUCCH}$ indicated by the TPC command

| TPC Command Field in DCI format 1A/1B/1D/1/2A/2B/2C/2D/2/3 | $\delta_{PUCCH}$ [dB] |
|---|---|
| 2 | 1 |
| 3 | 3 |

TABLE 2

The correspondence relationship between the TPC
command field in the DCI format 3A and the value of
$\delta_{PUCCH}$ indicated by the TPC command

| TPC Command Field in DCI format 3A | $\delta_{PUCCH}$ [dB] |
|---|---|
| 0 | −1 |
| 1 | 1 |

When the UE detects both of the categories of PDCCHs above in a subframe, the UE adjusts the power according to the TPC command in the first category of PDCCH, and if there is no PDCCH detected, then $\delta_{PUCCH}=0$ dB.

M represents the number of downlink subframes for which TPC commands are cumulated, i.e., the number of downlink subframes, on the PCC, for which ACK/NACK is fed back, corresponding to the current uplink subframe, and $k_m$ represents an index of each of the M downlink subframes, where M=1 and $k_0=4$ for Frequency Division Duplex (FDD), and M and $k_m$ are dependent upon the TDD uplink/downlink configuration for Time Division Duplex (TDD) as depicted in Table 3 where M represents the number of elements in the set K.

TABLE 3

The set K of indexes of TDD downlink subframes: $\{k_0, k_1, \text{A } k_{M-1}\}$

| Uplink/downlink configuration | Subframe index | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

Noted here the plurality of radio frames are arranged in sequence, that is, if the last subframe in the radio frame a is represented as k, then the first subframe in the radio frame a+1 is represented as k+1, and Table 3 illustrates K corresponding to the respective uplink subframes merely taking a radio frame as an example, where n−k<0 represents a downlink subframe in the preceding radio frame.

Particularly if the UE does not transmit PUCCH, but receives the DCI format 3/3A in which a TPC command is carried, on the PCC, then the UE determines $P_{PUCCH}(i)=\min\{P_{CMAX,c}(i), P_{0\_PUCCH}+PL_c+g(i)\}$ [dBm].

As illustrated in FIG. 3A, FIG. 3B and FIG. 3C, the LTE system supports three duplex modes of FDD, Half-FDD (H-FDD) and TDD.

TDD-FDD Carrier aggregation may be supported in the evolved system subsequent to the LTE-A system. Since the FDD carrier and the TDD carrier operate in different modes, a new uplink Acknowledgement/Non-Acknowledgement (ACK/NACK) transmission solution may be introduced, that is:

The eNB groups the aggregated downlink carriers into N sets as $S_i$ of downlink carriers, where a downlink carrier belongs to only one set of downlink carriers. The carriers in the same set of downlink carriers operate in the same duplex mode. The same TDD uplink/downlink configuration is applied to all the TDD carriers in a set of carriers.

The eNB configures the set $S_i$ of downlink carriers with an uplink carrier $C_{UL,i}$, where the same duplex mode as the set of downlink carriers is applied to the uplink carrier $C_{UL,i}$ and the same TDD uplink/downlink configuration as the set of downlink carriers is applied to the uplink carrier $C_{UL,i}$. Uplink carriers corresponding to different sets of downlink carriers are different from each other as illustrated in FIG. 4.

The UE transmits ACK/NACK information, corresponding to downlink data received on the downlink carriers among the set $S_i$, via a PUCCH on the uplink carrier $C_{UL,i}$, that is, the UE can transmit PUCCHs respectively on a plurality of uplink carriers.

Apparently if ACK/NACK feedbacks are transmitted per set of carriers, that is, aggregated carriers are grouped into a plurality of sets of carriers, and an uplink carrier is specified for each set of carriers to feed back ACK/NACK of downlink data received on the carriers in the each set, so that the UE may be configured with a plurality of uplink carriers to transmit PUCCHs. There has been absent a corresponding solution to controlling PUCCH power when the UE supports transmission of PUCCHs on different uplink carriers corresponding to different sets of carriers.

SUMMARY

Embodiments of the invention provide a method and device for controlling PUCCH power so as to control PUCCH power when a UE supports transmission of PUCCHs on different uplink carriers corresponding to different sets of carriers.

A method for controlling Physical Uplink Control Channel (PUCCH) power includes:
  determining, by a User Equipment (UE), one or more uplink carriers for PUCCH transmission in a current uplink subframe, wherein the one or more uplink carriers are at least one of uplink carriers used to transmit Uplink Control Information (UCI) via PUCCHs for respective sets of carriers of the UE, each set of carriers of the UE corresponds to one of the uplink carriers used to transmit UCI, and the uplink carriers used to transmit UCI corresponding to different sets of carriers are different from each other;

determining, by the UE, a power adjustment cumulative amount corresponding to a PUCCH to be transmitted on each of the one or more uplink carriers for PUCCH transmission in the current uplink subframe, based upon at least one Transmission Power Control (TPC) command received on at least one downlink carrier among at least one set of carriers for which UCI is to be transmitted via the PUCCH on the each of the one or more uplink carriers in the current uplink subframe; and determining, by the UE, transmit power of the PUCCH to be transmitted on the each of the one or more uplink carriers for PUCCH transmission in the current uplink subframe, based upon PUCCH power control parameters corresponding to the each of the one or more uplink carriers and the power adjustment cumulative amount corresponding to the each of the one or more uplink carriers.

A device for controlling PUCCH power includes:

an uplink carrier determining unit, configured to determine one or more uplink carrier for PUCCH transmission in a current uplink subframe, wherein the one or more uplink carriers are at least one of uplink carriers used to transmit UCI via PUCCHs for respective sets of carriers of a UE, each set of carriers of the UE corresponds to one of the uplink carriers used to transmit UCI, and the uplink carriers used to transmit UCI corresponding to different sets of carriers are different from each other;

a power adjustment cumulative amount determining unit, configured to determine a power adjustment cumulative amount corresponding to a PUCCH to be transmitted on each of one or more uplink carriers for PUCCH transmission in the current uplink subframe, based upon at least one TPC command received on at least one downlink carrier among at least one set of carriers for which UCI is to be transmitted via the PUCCH on the each of one or more uplink carriers in the current uplink subframe; and a transmit power determining unit, configured to determine transmit power of the PUCCH to be transmitted on the each of one or more uplink carriers for PUCCH transmission in the current uplink subframe, based upon PUCCH power control parameters corresponding to the each of the one or more uplink carriers and the power adjustment cumulative amount corresponding to the each of the one or more uplink carriers.

The embodiments of the invention provide a method and device for controlling PUCCH power, where a UE is configured with a plurality of sets of carriers, and each set of carriers corresponds to one specified uplink carrier used to transmit UCI via a PUCCH, so that when UCI is transmitted in PUCCHs on the specified uplink carriers corresponding to the different sets of carriers, power of each PUCCH is controlled based upon power control parameters corresponding to the uplink carrier for PUCCH transmission and at least one TPC command received on the corresponding set of carriers, that is, when the UE supports transmission of PUCCHs on different uplink carriers corresponding to different sets of carriers, the UE determines one or more uplink carriers for PUCCH transmission in a current uplink subframe, and determines a power adjustment cumulative amount corresponding to a PUCCH to be transmitted on each of the one or more uplink carrier for PUCCH transmission in the current uplink subframe, based upon at least one TPC command received on at least one downlink carrier among at least one set of carriers for which UCI is to be transmitted via the PUCCH on the each of the one or more uplink carriers in the current uplink subframe; and determines transmit power of the PUCCH to be transmitted on the each of the one or more uplink carriers for PUCCH transmission in the current uplink subframe based upon PUCCH power control parameters corresponding to each of the one or more the uplink carriers, and the power adjustment cumulative amount corresponding to the each of the one or more uplink carriers, to thereby control PUCCH power.

DETAILED DESCRIPTION OF THE EMBODIMENTS

The embodiments of the invention provide a method and device for controlling PUCCH power, where a UE is configured with a plurality of sets of carriers, and each set of carriers corresponds to one specified uplink carrier used to transmit UCI via a PUCCH, so that when UCI is transmitted via PUCCHs on the specified uplink carriers corresponding to the different sets of carriers, power of each PUCCH is controlled based upon power control parameters corresponding to the uplink carrier for PUCCH transmission and at least one TPC command received on the corresponding set of carriers, that is, when the UE supports transmission of PUCCHs on different uplink carriers corresponding to different sets of carriers, the UE determines one or more uplink carriers for PUCCH transmission in a current uplink subframe, and determines a power adjustment cumulative amount corresponding to a PUCCH to be transmitted on each of the one or more uplink carriers for PUCCH transmission in the current uplink subframe, based upon at least one TPC command received on at least one downlink carrier among at least one set of carriers for which UCI is to be transmitted via the PUCCH on the each of the one or more uplink carriers in the current uplink subframe; and determines transmit power of the PUCCH to be transmitted on the each of the one or more uplink carriers for PUCCH transmission in the current uplink subframe based upon PUCCH power control parameters corresponding to the each of the one or more uplink carriers, and the power adjustment cumulative amount corresponding to the each of the one or more uplink carriers, to thereby control PUCCH power.

Figure 1:
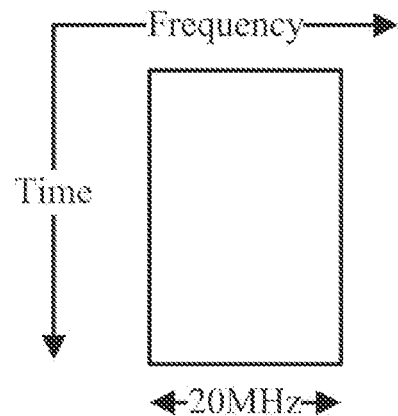
FIG. 1 illustrates a schematic diagram of distributed LTE cell carriers in the prior art.
Figure 2:
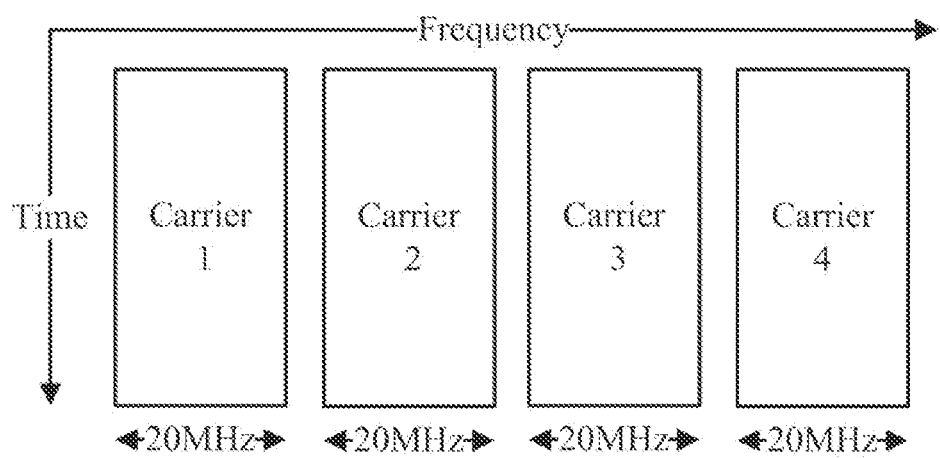
FIG. 2 illustrates a schematic diagram of aggregated LTE-A carriers in the prior art.
Figure 3A:
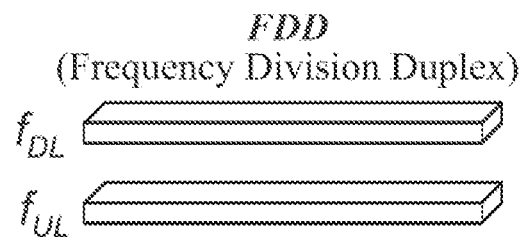
FIG. 3A to FIG. 3C illustrate a schematic diagram of the duplex modes in the prior art.
Figure 3B:
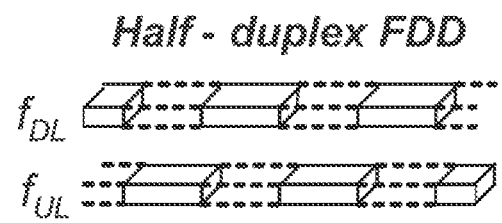
Figure 3C:
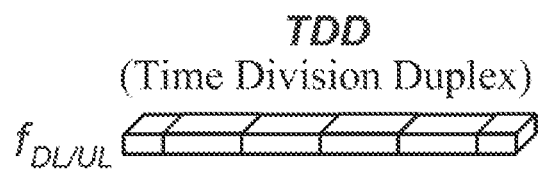
Figure 4:
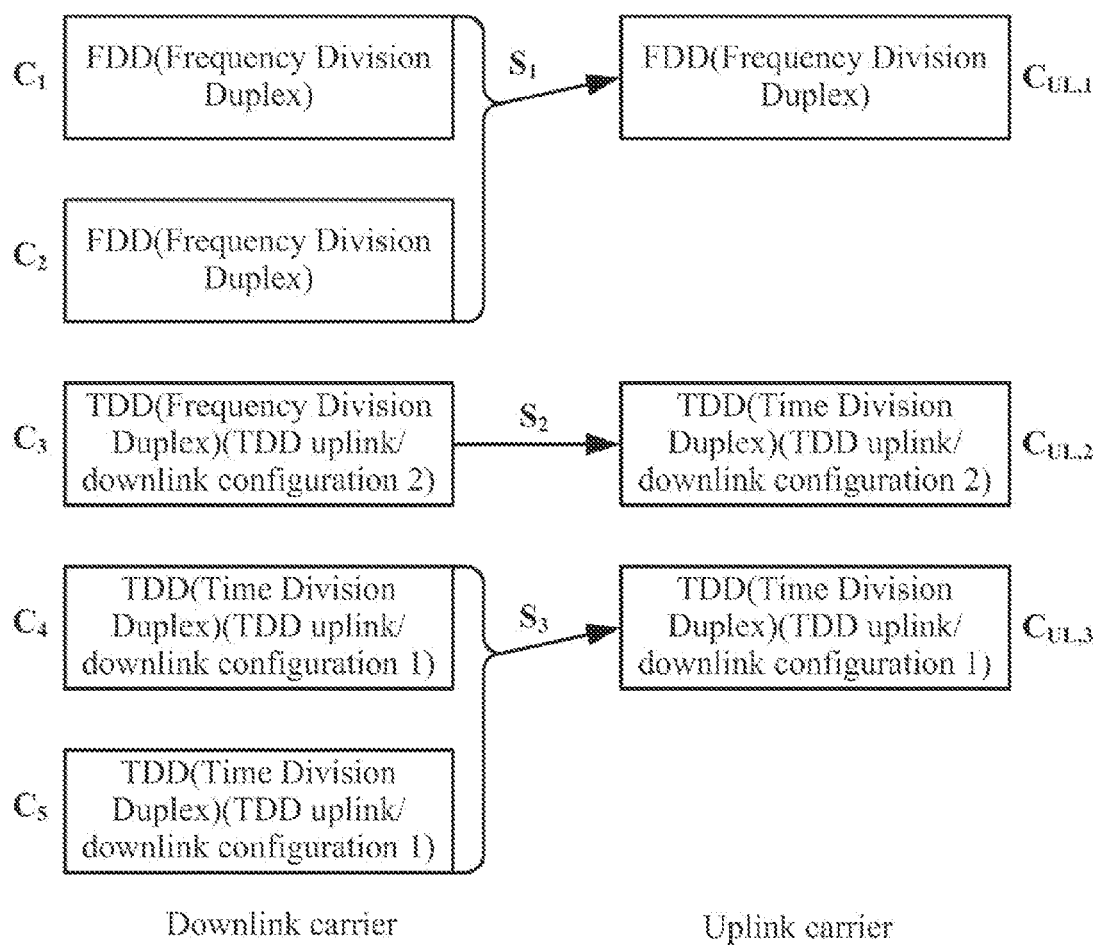
FIG. 4 illustrates a schematic diagram of a PUCCH transmitted per set of carriers in the prior art.
Figure 5:
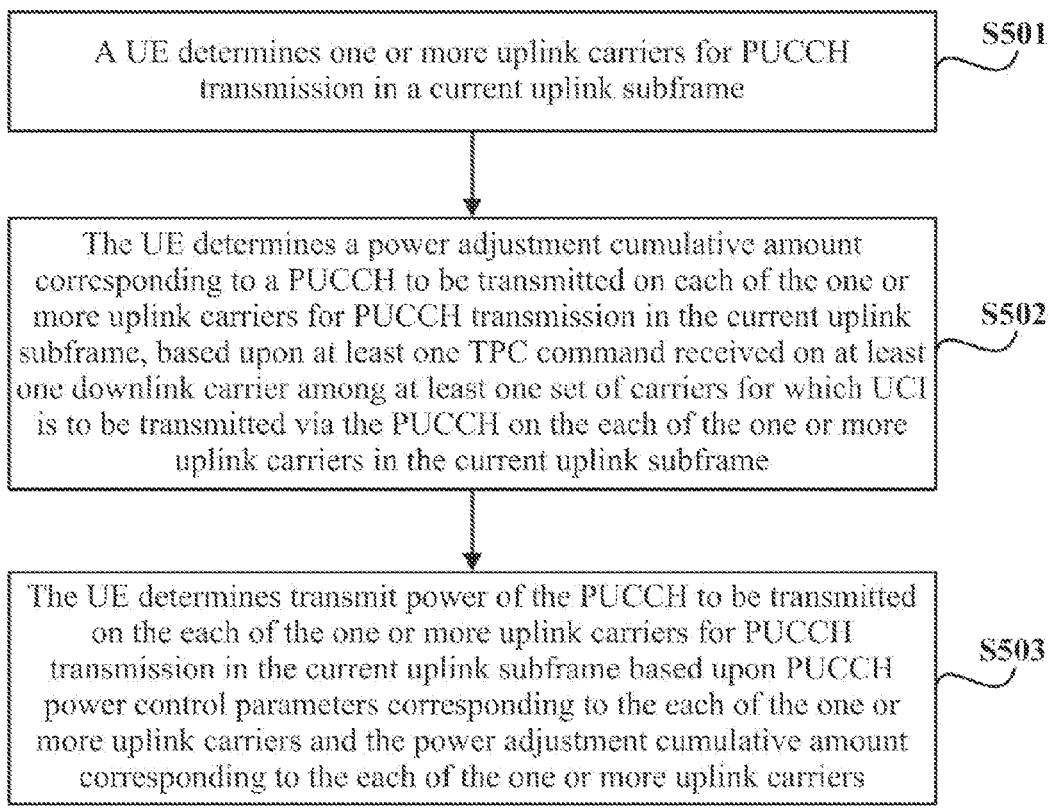
FIG. 5 illustrates a flow chart of a method for controlling PUCCH power according to an embodiment of the invention.

As illustrated in FIG. 5, a method for controlling PUCCH power according to an embodiment of the invention includes:

In the step S501, a UE determines one or more uplink carriers for PUCCH transmission in a current uplink subframe, where the one or more uplink carriers are at least one of uplink carriers used to transmit UCI via PUCCHs for respective sets of carriers of the UE, each set of carriers of the UE corresponds to one of the uplink carriers used to transmit UCI, and the uplink carriers used to transmit UCI corresponding to different sets of carriers are different from each other;

In the step S502, the UE determines a power adjustment cumulative amount corresponding to a PUCCH to be transmitted on each of the one or more uplink carriers for PUCCH transmission in the current uplink subframe, based upon at least one TPC command received on at least one downlink carrier among at least one set of carriers for which UCI is to be transmitted via the PUCCH on the each of the one or more uplink carriers in the current uplink subframe; and In the step S503, the UE determines transmit power of the PUCCH to be transmitted on the each of the one or more uplink carriers for PUCCH transmission in the current uplink subframe, based upon PUCCH power control parameters corresponding to the each of the one or more uplink carriers and the power adjustment cumulative amount corresponding to the each of the one or more uplink carriers.

With the steps above, when UCI is to be transmitted via PUCCHs on specified uplink carriers corresponding to different sets of carriers, power of each PUCCH can be controlled based upon power control parameters corresponding to the uplink carrier on which the PUCCH is to be transmitted and at least one TPC command received on the corresponding set of carriers.

Furthermore in the step S501, before the UE determines the one or more uplink carriers for PUCCH transmission in the current uplink subframe, the method further includes:

According to a received configuration information transmitted by the network side or as predefined with the network side, the UE determines that N configured carriers of the UE are grouped into A sets of carriers, and determines the uplink carriers used to transmit UCI via PUCCHs for the respective sets of carriers, where 1≤A≤N, and each set of carriers includes at least one carrier.

In the step S502, the UE determines the power adjustment cumulative amount corresponding to the PUCCH to be transmitted on the each of the one or more uplink carriers for PUCCH transmission in the current uplink subframe, based upon at least one TPC command received on at least one downlink carrier among at least one set of carriers for which UCI is to be transmitted via the PUCCH on the each of the one or more uplink carriers in the current uplink subframe particularly as follows:

The UE determines that the power adjustment cumulative amount g(i) corresponding to the PUCCH to be transmitted on the each of the one or more uplink carriers in the current uplink subframe i is the sum of power adjustment amounts $\delta_{PUCCH}$ respectively indicated by PDCCHs/EPDCCHs received, on at least one downlink carrier among at least one set of carriers, in M downlink subframes of the at least one set of carriers and a power adjustment cumulative amount g(i−1) corresponding to a PUCCH on the each of the one or more uplink carriers in a uplink subframe preceding the current uplink subframe, where the power adjustment amounts $\delta_{PUCCH}$ are indicated respectively by TPC commands carried on the PDCCHs/EPDCCHs, and M represents the number of downlink subframes, in each set of the at least one set of carriers for which UCI is to be transmitted via the PUCCH on the each of the one or more uplink carriers, for which ACK/NACK of downlink data needs to be fed back in the current uplink subframe i, i.e., the number of elements in the set K as depicted in Table 3, where M=1 for FDD, and M may take the value of 1, 2, 3, 4, 9, etc., for TDD, and different uplink subframes correspond to different values of M dependent upon the uplink/downlink configuration in TDD.

When UCI for a plurality of sets of carriers is transmitted via a PUCCH on the same uplink carrier at the same time, and the power adjustment cumulative amount needs to take into account the power adjustment amounts $\delta_{PUCCH}$ indicated by PDCCHs/EPDCCHs transmitted on a part or all of carriers in the plurality of sets of carriers, M may take the largest one of values of M corresponding to different sets of carriers among the plurality of sets of carriers, for example, if a set S1 of carriers operates in FDD and corresponds to M=1, and a set S2 of carriers operates in TDD and corresponds to M=4, and UCI of the sets of carriers S1 and S2 is to be transmitted via a PUCCH on the same uplink carrier, then M=max(1,4)=4 is taken for determining the power control cumulative amount corresponding to the PUCCH; or for each set of carriers, the power is cumulated respectively with the values of M corresponding to the set of carriers, for example, if a set S1 of carriers operates in FDD and corresponds to M=1, and a set S2 of carriers operates in TDD and corresponds to M=4, and UCI of the sets of carriers S1 and S2 is to be transmitted via a PUCCH on the same uplink carrier, then the PUCCH power control cumulative amount is determined by cumulating for the S1 and the S2 the power adjustment amounts $\delta_{PUCCH}$ with their respective values of M and further summing up the accumulation results of the S1 and the S2.

Particularly when there is no PDCCH/EPDCCH received on at least one downlink carrier among the at least one set of carriers in one of the M downlink subframes, the power adjustment amount $\delta_{PUCCH}$=0 in the downlink subframe can be determined.

Here power adjustment amounts $\delta_{PUCCH}$ indicated by PDCCHs/EPDCCHs received, on at least one downlink carrier among at least one set of carriers, in M downlink subframes of the at least one set of carriers can be determined for different sets of carriers and setting conditions of downlink carriers particularly in a number of ways, which will be described below in details in particular embodiments thereof:

First Embodiment

Power adjustment amounts $\delta_{PUCCH}$ are determined as power adjustment amounts $\delta_{PUCCH}$ respectively indicated by PDCCHs/EPDCCHs received, on one downlink carrier dedicated in one set of carriers for which UCI is to be transmitted via the PUCCH on the uplink carrier, in M downlink subframes of the set of carriers; that is, when UCI of only one set of carriers is fed back via one PUCCH, $\delta_{PUCCH}$ received in M downlink subframes of one set of carriers in a correspondence relationship with the uplink carrier (that is, the uplink carrier is preconfigured or pre-defined as an uplink carrier used to transmit UCI for the set of carriers via a PUCCH) are summed up, where $\delta_{PUCCH}$ indicated by only one PDCCH/EPDCCH received on one downlink carrier dedicated in the set of carriers is cumulated in each downlink subframe.

Particularly power adjustment amounts cur corresponding to TPC commands in PDCCHs/EPDCCHs received on one downlink carrier dedicated in one corresponding set of carriers for which UCI is transmitted via a PUCCH on the uplink carrier in M downlink subframes of the set of carriers are summed up (that is, power adjustment amounts $\delta_{PUCCH}$ corresponding to TPC commands in PDCCHs/EPDCCHs received in M downlink subframes on one downlink carrier dedicated in one corresponding set of carriers for which UCI is transmitted via a PUCCH on the uplink carrier are summed up), and further added to a power adjustment cumulative amount g(i−1) corresponding to a PUCCH on the uplink carrier in a uplink subframe preceding the current uplink subframe, resulting in a power adjustment cumulative amount g(i) corresponding to a PUCCH on the uplink carrier in a current uplink subframe, that is, $$g(i) = g(i-1) + \sum_{m=0}^{M_j-1} \delta_{PUCCH,c^{(j)}}^{(j)}(i-k_m),$$

where j represents the index of the corresponding set of carriers for which UCI is transmitted via a PUCCH on the uplink carrier, $k_m$ represents the subframe index of each of the $M_j$ downlink subframes of the set j of carriers relative to the current uplink subframe i, and $\delta_{PUCCH,c^{(j)}}^{(j)}(i-k_m)$ represents a power adjustment amount corresponding to a TPC command obtained in each downlink subframe on the one downlink carrier $c^{(j)}$ dedicated in the set j of carriers ($c^{(j)}$ represents the index of the downlink carrier among the set j of carriers);

Here the dedicated one downlink carrier is preconfigured by higher-layer signaling or predefined between a UE and an eNB.

Preferably the dedicated one downlink carrier is such a downlink carrier among the one set of carriers that is paired with (that is, the correspondence relationship between the uplink carrier and the downlink carrier is signaled to the UE in a System Information Block (SIB)-2, also referred to as an SIB-2 linkage relationship) the uplink carrier used to transmit UCI via the PUCCH for the set of downlink carriers (i.e., the uplink carrier involved in calculation of transmit power of the PUCCH as above).

Second Embodiment

Power adjustment amounts $\delta_{PUCCH}$ are determined as power adjustment amounts $\delta_{PUCCH}$ respectively indicated by PDCCHs/EPDCCHs received on any one downlink carrier among one set of carriers for which UCI is to be transmitted via the PUCCH on the each of the one or more uplink carriers, in M downlink subframes of the one set of carriers; that is, when UCI of only one set of carriers is fed back via one PUCCH, $\delta_{PUCCH}$ received in M downlink subframes of one set of carriers are summed up, where $\delta_{PUCCH}$ indicated by only one PDCCH/EPDCCH is cumulated in each downlink subframe, the PDCCH/EPDCCH above received on any one downlink carrier among the set of carriers can be selected for power accumulation in each downlink subframe, and $\delta_{PUCCH}$ can be obtained on a different downlink carrier in each downlink subframe; and if the PDCCHs/EPDCCHs above are received on all the downlink carriers of the set of carriers in one downlink subframe, then the same $\delta_{PUCCH}$ shall be indicated by these PDCCHs/EPDCCHs, and one of them can be selected for summing up.

Particularly power adjustment amounts $\delta_{PUCCH}$ corresponding to TPC commands in PDCCHs/EPDCCHs received on any one downlink carrier among one corresponding set of carriers for which UCI is transmitted via a PUCCH on the uplink carrier, in M respective downlink subframes of the set of carriers are summed up (that is, power adjustment amounts $\delta_{PUCCH}$ corresponding to TPC commands in PDCCHs/EPDCCHs received in M respective downlink subframes on any one downlink carrier among one corresponding set of carriers for which UCI is transmitted via a PUCCH on the uplink carrier are summed up), and further added to a power adjustment cumulative amount g(i−1) corresponding to a PUCCH on the uplink carrier in a uplink subframe preceding the current uplink subframe, resulting in a power adjustment cumulative amount g(i) corresponding to a PUCCH on the uplink carrier in a current uplink subframe, that is, $$g(i) = g(i-1) + \sum_{m=0}^{M_j-1} \delta_{PUCCH,c^{(j)}}^{(j)}(i-k_m),$$

where j represents the index of the corresponding set of carriers for which UCI is transmitted via a PUCCH on the uplink carrier, $k_m$ represents the subframe index of each of the $M_j$ downlink subframes of the set j of carriers relative to the current uplink subframe i, and $\delta_{PUCCH,c^{(j)}}^{(j)}(i-k_m)$ represents a power adjustment amount corresponding to an obtained TPC command on the said any one downlink carrier among the set j of carriers in each downlink subframe;

Here TPC commands in PDCCHs/EPDCCHs transmitted in the same downlink subframe on a plurality of downlink carriers among the same set of carriers are the same.

Third Embodiment

Power adjustment amounts $\delta_{PUCCH}$ are determined as power adjustment amounts $\delta_{PUCCH}$ respectively indicated by PDCCHs/EPDCCHs received on all downlink carriers of one set of carriers for which UCI is to be transmitted via the PUCCH on the uplink carrier, in M downlink subframes of the one set of carriers; that is, when UCI of only one set of carriers is fed back via one PUCCH, $\delta_{PUCCH}$ received in M downlink subframes of one set of carriers are summed up, where $\delta_{PUCCH}$ indicated by a plurality of PDCCHs/EPDCCHs may be cumulated in each downlink subframe, these PDCCHs/EPDCCHs are PDCCHs/EPDCCHs received on all the downlink carrier among the set of carriers in the downlink subframe, and $\delta_{PUCCH}$ indicated by these PDCCHs/EPDCCHs may not be the same.

Particularly power adjustment amounts $\delta_{PUCCH}$ corresponding to TPC commands in PDCCHs/EPDCCHs received, on all downlink carriers of the set of carriers for which UCI is transmitted via a PUCCH on the uplink carrier, in M downlink subframes of the set of carriers, are summed up (that is, power adjustment amounts $\delta_{PUCCH}$ corresponding to TPC commands in PDCCHs/EPDCCHs received in M downlink subframes on all downlink carriers of one corresponding set of carriers for which UCI is transmitted via a PUCCH on the uplink carrier, are summed up), and further added to a power adjustment cumulative amount g(i−1)

corresponding to a PUCCH on the uplink carrier in a uplink subframe preceding the current uplink subframe, resulting in a power adjustment cumulative amount g(i) corresponding to a PUCCH on the uplink carrier in a current uplink subframe, that is, $$g(i) = g(i-1) + \sum_{c^{(j)} \in \{c_a, c_b, \ldots c_x\}^{(j)}} \sum_{m=0}^{M_j-1} \delta_{PUCCH,c^{(j)}}^{(j)}(i-k_m),$$

where j represents the index of the corresponding set of carriers for which UCI is transmitted via a PUCCH on the uplink carrier, $k_m$ represents the subframe index of each of the $M_j$ downlink subframes of the set j of carriers relative to the current uplink subframe i, $\{c_a, c_b, \ldots c_x\}^{(j)}$ represents a set of carrier indexes of the downlink carriers among the set j of carriers, $c^{(j)} \in \{c_a, c_b, \ldots c_x\}^{(j)}$ represents the carrier index (i.e., the carrier number) of each carrier in the set j of carriers, and $\delta_{PUCCH,c^{(j)}}^{(j)}(i-k_m)$ represents a power adjustment amount corresponding to a TPC command obtained in each downlink subframe on each downlink carrier among the set j of carriers.

Fourth Embodiment

Power adjustment amounts $\delta_{PUCCH}$ are determined as power adjustment amounts $\delta_{PUCCH}$ respectively indicated by PDCCHs/EPDCCHs received, on one downlink carrier dedicated in one set of carriers determined among a plurality of sets of carriers for which UCI is to be transmitted via the PUCCH on the uplink carrier, in M downlink subframes of the determined one set of carriers; that is, when UCI of a plurality of sets of carriers is fed back on one PUCCH, only one of the plurality of sets of carriers is determined, and $\delta_{PUCCH}$ received in M downlink subframes of the determined set of carriers are summed up, where $\delta_{PUCCH}$ indicated by only one PDCCH/EPDCCH received on one downlink carrier dedicated in one set of carriers determined among a plurality of sets of carriers is cumulated in each downlink subframe.

Particularly one set t of carriers is selected from a plurality of corresponding sets of carriers for which UCI is transmitted via a PUCCH on the uplink carrier, and power adjustment amounts $\delta_{PUCCH}$ corresponding to TPC commands in PDCCHs/EPDCCHs received, on one downlink carrier dedicated in one set of carriers determined among a plurality of sets of carriers, in $M_t$ downlink subframes of the selected set of carriers, are summed up (that is, one set t of carriers is determined from a plurality of corresponding sets of carriers for which UCI is transmitted via a PUCCH on the uplink carrier, and power adjustment amounts $\delta_{PUCCH}$ corresponding to TPC commands in PDCCHs/EPDCCHs received in $M_t$ downlink subframes on one downlink carrier dedicated in one set of carriers determined among a plurality of sets of carriers), and further added to a power adjustment cumulative amount g(i−1) corresponding to a PUCCH on the uplink carrier in a uplink subframe preceding the current uplink subframe, resulting in a power adjustment cumulative amount g(i) corresponding to a PUCCH on the uplink carrier in a current uplink subframe, that is, $$g(i) = g(i-1) + \sum_{m=0}^{M_t-1} \delta_{PUCCH,c^{(t)}}^{(t)}(i-k_m),$$

where t represents the index of the determined one set of carriers from the plurality of sets of carriers, $k_m$ represents the subframe index of each of the $M_t$ downlink subframes of the set t of carriers relative to the current uplink subframe i, and $\delta_{PUCCH,c^{(t)}}^{(t)}(i-k_m)$ represents a power adjustment amount corresponding to a TPC command obtained in each downlink subframe on the one downlink carrier $c^{(t)}$ dedicated in one set of carriers determined among a plurality of sets of carriers ($c^{(t)}$ represents the index of the downlink carrier among the set t of carriers);

Here $M_t$ represents the number of downlink carriers, for which ACK/NACK of downlink data needs to be fed back in the current uplink subframe i, in the determined one set t of carriers for which UCI is transmitted via a PUCCH on the uplink carrier (the values of M corresponding to different sets of carriers in the current uplink subframe i may be different), and the determined one set of carriers, and the one downlink carrier dedicated in the determined set of carriers are preconfigured by higher-layer signaling or predefined between a UE and an eNB.

Preferably the determined one set of carriers is such a set of carriers, preconfigured by higher-layer signaling or predefined, that corresponds to the uplink carrier, and the dedicated one downlink carrier is such a downlink carrier among the determined one set of carriers that is paired (SIB-2 linkage) with the uplink carrier.

Fifth Embodiment

Power adjustment amounts $\delta_{PUCCH}$ are determined as power adjustment amounts $\delta_{PUCCH}$ respectively indicated by PDCCHs/EPDCCHs received, on any one downlink carrier among one set of carriers determined among a plurality of sets of carriers for which UCI is to be transmitted via the PUCCH on the uplink carrier, in M downlink subframes of the determined one set of carriers; that is, when UCI of a plurality of sets of carriers is fed back via one PUCCH, only one set of carriers determined among the plurality of sets of carriers, and $\delta_{PUCCH}$ received in M downlink subframes of the determined one set of carriers are summed up, where $\delta_{PUCCH}$ indicated by only one PDCCH/EPDCCH is cumulated in each downlink subframe, the PDCCH/EPDCCH above received on any one downlink carrier among the determined one set of carriers can be selected for power accumulation in each downlink subframe, and $\delta_{PUCCH}$ can be obtained on a different downlink carrier in each downlink subframe; and if the PDCCHs/EPDCCHs above are received on all the downlink carriers of the set of carriers in one downlink subframe, then the same $\delta_{PUCCH}$ shall be indicated by these PDCCHs/EPDCCHs, and one of them can be selected for summing up.

Particularly one set t of carriers is determined among a plurality of corresponding sets of carriers for which UCI is transmitted via a PUCCH on the uplink carrier, and power adjustment amounts $\delta_{PUCCH}$ corresponding to TPC commands in PDCCHs/EPDCCHs received, on any one downlink carrier among the determined one set of carriers, in $M_t$ downlink subframes of the set of carriers, are summed up (that is, one set t of carriers is determined among a plurality of corresponding sets of carriers for which UCI is transmitted via a PUCCH on the uplink carrier, and power adjustment amounts $\delta_{PUCCH}$ corresponding to TPC commands in PDCCHs/EPDCCHs received in $M_t$ respective downlink subframes on any one downlink carrier among the determined set t of carriers), and further added to a power adjustment cumulative amount g(i−1) corresponding to a PUCCH on the uplink carrier in a uplink subframe preceding the current uplink subframe, resulting in a power adjustment cumulative amount g(i) corresponding to a PUCCH on the uplink carrier in a current uplink subframe, that is, $$g(i) = g(i-1) + \sum_{m=0}^{M_t-1} \delta_{PUCCH}^{(t)}(i-k_m),$$

where t represents the index of the determined one set of carriers from the plurality of sets of carriers, $k_m$ represents the subframe index of each of the $M_t$ downlink subframes of the determined set t of carriers relative to the current uplink subframe i, and $\delta_{PUCCH}^{(t)}(i-k_m)$ represents a power adjustment amount corresponding to a TPC command obtained in a PDCCH/EPDCCH transmitted on the said any one downlink carrier among the determined set t of carriers in each downlink subframe;

Here $M_t$ represents the number of downlink subframes, for which ACK/NACK of downlink data needs to be fed back in the current uplink subframe i, in the determined one set t of carriers for which UCI is transmitted via a PUCCH on the uplink carrier (the values of M corresponding to different sets of carriers in the current uplink subframe i may be different), the determined one set of carriers is preconfigured by higher-layer signaling or predefined between a UE and an eNB, and TPC commands in PDCCHs/EPDCCHs transmitted in the same downlink subframe on a plurality of downlink carriers among the same or different sets of carriers are the same.

Preferably the determined one set of carriers is such a set of carriers, preconfigured by higher-layer signaling or pre-defined, that corresponds to the uplink carrier.

Sixth Embodiment

Power adjustment amounts $\delta_{PUCCH}$ are determined as power adjustment amounts $\delta_{PUCCH}$ respectively indicated by PDCCHs/EPDCCHs received, on all downlink carriers determined among a plurality of sets of carriers for which UCI is to be transmitted via the PUCCH on the uplink carrier, in M downlink subframes of the determined one set of carriers; that is, when UCI of a plurality of sets of carriers is fed back via one PUCCH, only one of the plurality of sets of carriers is determined, and $\delta_{PUCCH}$ received in M downlink subframes of the determined set of carriers, are summed up, where $\delta_{PUCCH}$ indicated by a plurality of PDCCHs/EPDCCHs may be cumulated in each downlink subframe, these PDCCHs/EPDCCHs are PDCCHs/EPDCCHs received, on all the downlink carriers of the determined one set of carriers, in the downlink subframe, and $\delta_{PUCCH}$ indicated by these PDCCHs/EPDCCHs may not be the same.

Particularly one set t of carriers is determined among a plurality of corresponding sets of carriers for which UCI is transmitted via a PUCCH on the uplink carrier, and power adjustment amounts $\delta_{PUCCH}$ corresponding to TPC commands in PDCCHs/EPDCCHs received, on all downlink carriers of the determined set t of carriers, in $M_t$ downlink subframes of the determined set t of carriers, are summed up, and further added to a power adjustment cumulative amount g(i-1) corresponding to a PUCCH on the uplink carrier in a uplink subframe preceding the current uplink subframe, resulting in a power adjustment cumulative amount g(i) corresponding to a PUCCH on the uplink carrier in a current uplink subframe, that is, $$g(i) = g(i-1) + \sum_{c^{(t)} \in \{c_a, c_b, \ldots c_x\}^{(t)}} \sum_{m=0}^{M_t-1} \delta_{PUCCH,c^{(t)}}^{(t)}(i-k_m),$$

where t represents the index of the one set of carriers determined among a plurality of corresponding sets of carriers for which UCI is transmitted via a PUCCH on the uplink carrier, $k_m$ represents the subframe index of each of the $M_t$ downlink subframes of the determined set t of carriers relative to the current uplink subframe i, $\{c_a, c_b, \ldots c_x\}^{(t)}$ represents a set of carrier indexes of the downlink carriers among the determined set t of carriers, $c^{(t)} \in \{c_a, c_b, \ldots c_x\}^{(t)}$ represents the carrier index (i.e., the carrier number) of each carrier in the determined set t of carriers, and $\delta_{PUCCH,c^{(t)}}^{(t)}(i-k_m)$ represents a power adjustment amount corresponding to a TPC command obtained in each downlink subframe on each downlink carrier $c^{(t)}$ in the determined set t of carriers.

Seventh Embodiment

Power adjustment amounts $\delta_{PUCCH}$ are determined as power adjustment amounts $\delta_{PUCCH}$ respectively indicated by PDCCHs/EPDCCHs received, on one downlink carrier dedicated in each of a plurality of sets of carriers for which UCI is to be transmitted via a PUCCH on the uplink carrier, in M downlink subframes of the each of the plurality of set of carriers; that is, when UCI of a plurality of sets of carriers is fed back via one PUCCH, $\delta_{PUCCH}$ obtained on the plurality of sets of carriers in M respective downlink subframes are summed up, and $\delta_{PUCCH}$ obtained on only one downlink carrier among the respective sets of carriers are summed up, where $\delta_{PUCCH}$ indicated by only one PDCCH/EPDCCH is cumulated in each downlink subframe in each set of carriers, and the PDCCH/EPDCCH is a PDCCH/EPDCCH received on one downlink carrier dedicated in the set of carriers.

Particularly power adjustment amounts $\delta_{PUCCH}$ corresponding to TPC commands in PDCCHs/EPDCCHs received on dedicated one downlink carrier in $M_j$ downlink subframes respectively of each of a plurality of corresponding sets of carriers for which UCI is transmitted via a PUCCH on the uplink carrier are summed up (that is, power adjustment amounts $\delta_{PUCCH}$ corresponding to TPC commands in PDCCHs/EPDCCHs received in $M_j$ downlink subframes on one downlink carrier respectively dedicated in each of a plurality of corresponding sets of carriers for which UCI is transmitted via a PUCCH on the uplink carrier are summed up), and further added to a power adjustment cumulative amount g(i-1) corresponding to a PUCCH on the uplink carrier in a uplink subframe preceding the current uplink subframe, resulting in a power adjustment cumulative amount g(i) corresponding to a PUCCH on the uplink carrier in a current uplink subframe, that is, $$g(i) = g(i-1) + \sum_{j \in \{j_a, j_b, \ldots j_x\}} \sum_{m=0}^{M_j-1} \delta_{PUCCH,c^{(j)}}^{(j)}(i-k_m),$$

where $\{j_a, j_b, \ldots j_x\}$ represents a set of indexes of the plurality of sets of carriers for which UCI is transmitted via a PUCCH on the uplink carrier, $j \in \{j_a, j_b, \ldots j_x\}$ represents the indexes of the respective sets of carriers, $k_m$ represents the subframe index of each of the $M_j$ downlink subframes of the set j of carriers relative to the current uplink subframe i, and $\delta_{PUCCH,c^{(j)}}(i-k_m)$ represents a power adjustment amount corresponding to a TPC command obtained in each downlink subframe on the one downlink carrier $c^{(j)}$ dedicated in the set j of carriers;

Here $M_j$ represents the number of downlink carriers, for which ACK/NACK of downlink data needs to be fed back in the current uplink subframe i, in the set j of carriers for which UCI is transmitted via a PUCCH on the uplink carrier (the values of M corresponding to different sets of carriers in the current uplink subframe i may be different), and the one downlink carrier dedicated in each set of carriers are preconfigured by higher-layer signaling or predefined between a UE and an eNB.

Preferably the one downlink carrier dedicated in each set of carriers is such a downlink carrier among the set of carriers that is paired (SIB-2 linkage) with the uplink carrier used to transmit UCI for the set of downlink carriers.

Eighth Embodiment

Power adjustment amounts $\delta_{PUCCH}$ are determined as power adjustment amounts $\delta_{PUCCH}$ respectively indicated by PDCCHs/EPDCCHs received, on any one downlink carrier among each of a plurality of sets of carriers for which UCI is to be transmitted via a PUCCH on the uplink carrier, in M downlink subframes of the each of the plurality of sets of carriers; that is, when UCI of a plurality of sets of carriers is fed back via one PUCCH, $\delta_{PUCCH}$ on the respective sets of carriers in M respective downlink subframes are summed up, and $\delta_{PUCCH}$ is indicated by a PDCCH/EPDCCH received on any one downlink carrier among each of a plurality of sets of carriers, where $\delta_{PUCCH}$ indicated by only one PDCCH/EPDCCH is cumulated in each downlink subframe in each set of carriers, the PDCCH/EPDCCH above received on any downlink carrier among the set of carriers can be selected for power accumulation in each downlink subframe, and $\delta_{PUCCH}$ can be obtained on a different downlink carrier in each downlink subframe; and if the PDCCHs/EPDCCHs above are received on all the downlink carriers of the set of carriers in one downlink subframe, then the same $\delta_{PUCCH}$ shall be indicated by these PDCCHs/EPDCCHs, and one of them can be selected for summing up.

Particularly power adjustment amounts $\delta_{PUCCH}$ corresponding to TPC commands in PDCCHs/EPDCCHs received on any one downlink carrier respectively in each of a plurality of corresponding sets of carriers for which UCI is transmitted via a PUCCH on the uplink carrier, in $M_j$ downlink subframes of the set of carriers, are summed up (that is, power adjustment amounts $\delta_{PUCCH}$ corresponding to TPC commands in PDCCHs/EPDCCHs received on any one downlink carrier in $M_j$ respective downlink subframes respectively in each of a plurality of corresponding sets of carriers for which UCI is transmitted via a PUCCH on the uplink carrier are summed up), and further added to a power adjustment cumulative amount g(i−1) corresponding to a PUCCH on the uplink carrier in a uplink subframe preceding the current uplink subframe, resulting in a power adjustment cumulative amount g(i) corresponding to a PUCCH on the uplink carrier in a current uplink subframe, that is, $$g(i) = g(i-1) + \sum_{j\in(j_a,j_b,\ldots j_x)} \sum_{m=0}^{M_j-1} \delta_{PUCCH}^{(j)}(i-k_m),$$

where $\{j_a, j_b, \ldots j_x\}$ represents a set of indexes of the plurality of sets of carriers for which UCI is transmitted via a PUCCH on the uplink carrier, $j\in\{j_a, j_b, \ldots j_x\}$ represents the indexes of the respective sets of carriers, $k_m$ represents the subframe index of each of the $M_j$ downlink subframes of the set j of carriers relative to the current uplink subframe i, and $\delta_{PUCCH,c^{(j)}}(i-k_m)$ represents a power adjustment amount corresponding to a TPC command obtained on the said any one downlink carrier among the set j of carriers in each downlink subframe:

Here $M_j$ represents the number of downlink subframes, for which ACK/NACK of downlink data needs to be fed back in the current uplink subframe i, in the set j of carriers for which UCI is transmitted via a PUCCH on the uplink carrier (the values of M corresponding to different sets of carriers in the current uplink subframe i may be different), and TPC commands in PDCCHs/EPDCCHs transmitted in the same downlink subframe on a plurality of downlink carriers among the same set of carriers are the same.

Ninth Embodiment

Power adjustment amounts $\delta_{PUCCH}$ are determined as power adjustment amounts $\delta_{PUCCH}$ respectively indicated by PDCCHs/EPDCCHs received, on any one downlink carrier among a plurality of sets of carriers for which UCI is to be transmitted via a PUCCH on the uplink carrier, in M downlink subframes of the plurality of sets of carriers; that is, when UCI of a plurality of sets of carriers is fed back via one PUCCH, $\delta_{PUCCH}$ in each of M downlink subframes are summed up, and $\delta_{PUCCH}$ is indicated by a PDCCH/EPDCCH received on any one downlink carrier among any of the plurality of sets of carriers in the downlink subframe, where $\delta_{PUCCH}$ can be obtained on a different downlink carrier in each downlink subframe; and if the PDCCHs/EPDCCHs above are received on all the downlink carriers of the plurality of sets of carriers in one downlink subframe, then the same $\delta_{PUCCH}$ shall be indicated by these PDCCHs/EPDCCHs, and one of them can be selected for summing up.

Particularly power adjustment amounts $\delta_{PUCCH}$ corresponding to TPC commands in PDCCHs/EPDCCHs received, on any one downlink carrier among a plurality of corresponding sets of carriers for which UCI is transmitted via a PUCCH on the uplink carrier, in M downlink subframes of the plurality of sets of carriers, are summed up, and further added to a power adjustment cumulative amount g(i−1) corresponding to a PUCCH on the uplink carrier in a uplink subframe preceding the current uplink subframe, resulting in a power adjustment cumulative amount g(i) corresponding to a PUCCH on the uplink carrier in a current uplink subframe, that is, $$g(i) = g(i-1) + \sum_{m=0}^{M-1} \delta_{PUCCH}(i-k_m),$$

where $k_m$ represents the subframe index of each of the M downlink subframes of the plurality of sets of carriers relative to the current uplink subframe i, and $\delta_{PUCCH}(i-k_m)$ represents a power adjustment amount corresponding to a TPC command obtained on the said any one downlink carrier among the plurality of sets of carriers in the downlink subframe $i-k_m$;

Preferably if the plurality of sets of carriers correspond to different values of M, then M may take the largest one of the values of M corresponding to different sets of carriers among the plurality of sets of carriers for accumulation of power adjustment amounts, for example, if a set S1 of carriers operates in FDD and corresponds to M=1, and a set S2 of carriers operates in TDD and corresponds to M=4, and UCI of the sets of carriers S1 and S2 is transmitted via a PUCCH on the same uplink carrier, then the PUCCH power control cumulative amount is determined with M=max(1,4)=4.

Tenth Embodiment

Power adjustment amounts $\delta_{PUCCH}$ are determined as power adjustment amounts $\delta_{PUCCH}$ respectively indicated by PDCCHs/EPDCCHs received, on all downlink carriers of each of a plurality of sets of carriers for which UCI is to be transmitted via the PUCCH on the uplink carrier, in M downlink subframes of the each of the plurality of sets of carriers; that is, when UCI of a plurality of sets of carriers is fed back via one PUCCH, $\delta_{PUCCH}$ received in M respective downlink subframes on all the downlink carriers are summed up, where $\delta_{PUCCH}$ indicated by a plurality of PDCCHs/EPDCCHs may be cumulated in each of the M downlink subframes, these PDCCHs/EPDCCHs are PDCCHs/EPDCCHs received on all the downlink carriers of the plurality of sets of carriers in the downlink subframe, and $\delta_{PUCCH}$ obtained on different sets of carriers and downlink carriers may not be the same.

Particularly power adjustment amounts $\delta_{PUCCH}$ corresponding to TPC commands in PDCCHs/EPDCCHs received on all downlink carriers respectively in each of a plurality of corresponding sets of carriers for which UCI is transmitted via a PUCCH on the uplink carrier, in $M_j$ downlink subframes of the set of carriers are summed up (that is, power adjustment amounts $\delta_{PUCCH}$ corresponding to TPC commands in PDCCHs/EPDCCHs received in $M_j$ downlink subframes on all downlink carriers of a plurality of corresponding sets of carriers for which UCI is transmitted via a PUCCH on the uplink carrier are summed up), and further added to a power adjustment cumulative amount g(i−1) corresponding to a PUCCH on the uplink carrier in a uplink subframe preceding the current uplink subframe, resulting in a power adjustment cumulative amount g(i) corresponding to a PUCCH on the uplink carrier in a current uplink subframe, that is, $$g(i) = g(i-1) + \sum_{j \in \{j_a, j_b, \ldots j_x\}} \sum_{c^{(j)} \in \{c_r, c_t, \ldots c_y\}^{(j)}} \sum_{m=0}^{M_j - 1} \delta_{PUCCH, c^{(j)}}^{(j)}(i - k_m),$$

where
$\{j_a, j_b, \ldots j_x\}$ represents a set of indexes of the plurality of sets of carriers for which UCI is transmitted via a PUCCH on the uplink carrier, $\{c_r, c_t, \ldots c_y\}^{(j)}$ represents a set of carrier indexes of downlink carriers among the set j of carriers, $c(j) \in \{c_r, c_t, \ldots c_y\}^{(j)}$ represents the carrier index (i.e., the carrier number) of each carrier in the set j of carriers, $k_m$ represents the subframe index of each of the $M_j$ downlink subframes of the set j of carriers relative to the current uplink subframe i, and $\delta_{PUCCH, c^{(j)}}^{(j)}(i - k_m)$ represents a power adjustment amount corresponding to a TPC command obtained in each downlink subframe on each downlink carrier $c^{(j)}$ in the set j of carriers;

Here $M_j$ represents the number of downlink subframes, for which ACK/NACK of downlink data needs to be fed back in the current uplink subframe i, in the set j of carriers for which UCI is transmitted via a PUCCH on the uplink carrier (the values of M corresponding to different sets of carriers in the current uplink subframe i may be different).

It shall be noted that in the respective embodiments, the dedicated one downlink carrier may be particularly such a downlink carrier among the one set of carriers that is paired with the uplink carrier; and each of the PDCCHs/EPDCCHs may be a PDCCH/EPDCCH in which a TPC field is not reused to indicate ACK/NACK resource.

Particularly for the UE configured to transmit ACK/NACK in the PUCCH format 3, the PDCCH-EPDCCH is:
a PDCCH/EPDCCH transmitted on a Primary Component Carrier (PCC), and Downlink Assignments Index (DAI) value in the PDCCH/EPDCCH is equal to '1'; or
a PDCCH/EPDCCH used to schedule the PCC, and the DAI value in the PDCCH/EPDCCH is equal to '1'; or
a PDCCH/EPDCCH transmitted on a downlink carrier, paired with the each of the one or more uplink carriers, in each of the at least one set of carriers, and the DAI value in the PDCCH/EPDCCH is equal to '1'; or
a PDCCH/EPDCCH used to schedule a downlink carrier, paired with the each of the one or more uplink carriers, in each of the at least one set of carriers, and the DAI value in the PDCCH/EPDCCH is equal to '1'; and For the UE configured to transmit ACK/NACK using in the PUCCH format 1b with channel selection, each of the PDCCH/EPDCCH is:
A PDCCH/EPDCCH transmitted on a PCC; or
A PDCCH-EPDCCH transmitted on a downlink carrier, paired with the each of the one or more uplink carriers, in each of the at least one set of carriers.

The PUCCH power control parameters are particularly:
carrier specific parameters preconfigured by the network side through higher-layer signaling separately for each uplink carrier available for PUCCH transmission.

Particularly the PUCCH power control parameters include:
a carrier specific PUCCH initial power $P_{O\_NOMINAL\_PUCCH,c}$, a carrier and UE specific PUCCH initial power $P_{O\_UE\_PUCCH,c}$, a carrier and UE specific power offset $\Delta_{F\_PUCCH}(F)$ related to a PUCCH transmission format, and a carrier and UE specific power offset $\Delta_{TxD,c}(F')$ related to PUCCH transmission via two antenna ports, preconfigured by the network side through higher-layer signaling separately for each uplink carrier available for PUCCH transmission, where c represents a carrier index.

The UCI particularly includes one or more of ACK/NACK, periodical Channel State Information (CSI), and a Scheduling Request (SR).

Figure 6:
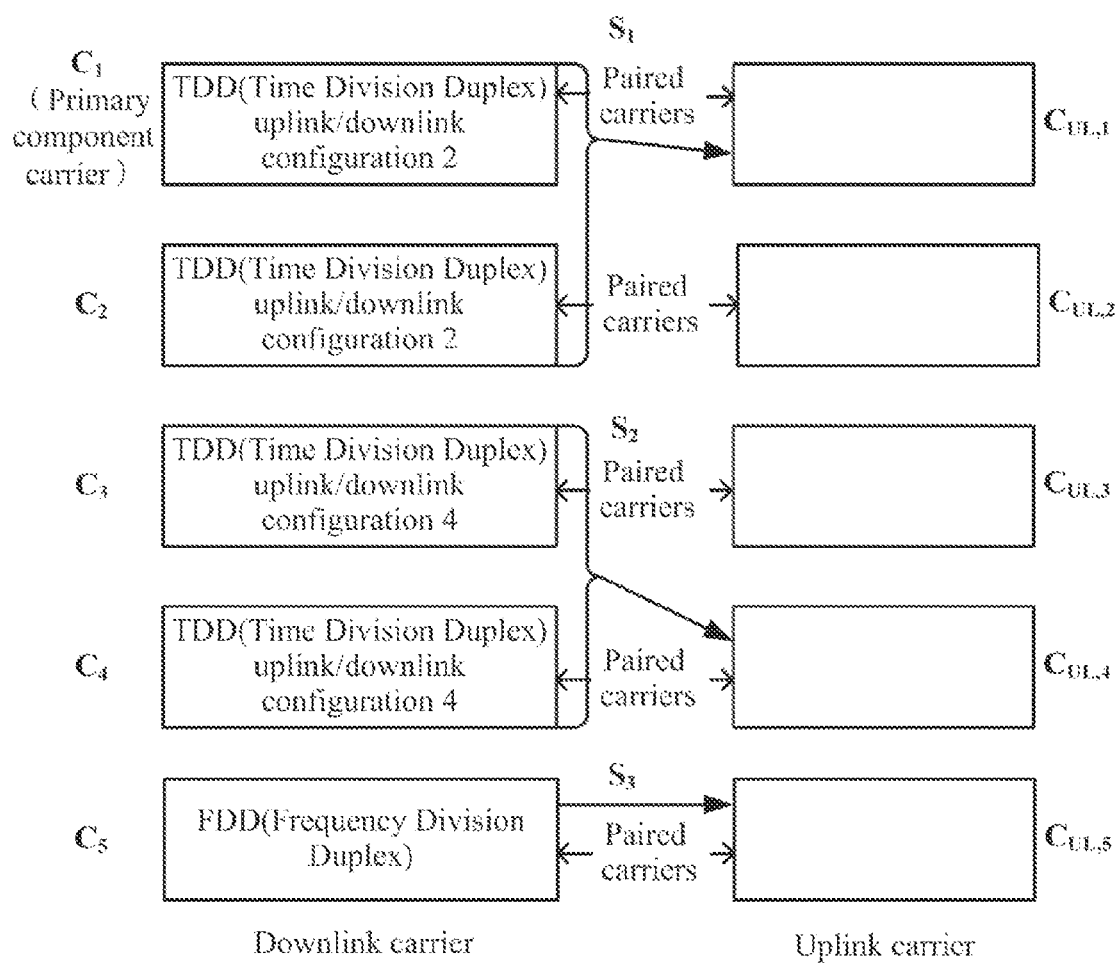
FIG. 6 illustrates a schematic diagram of a particular scenario where the method for controlling PUCCH power is applied according to an embodiment of the invention.

Determination of a power adjustment cumulative amount in the methods according to the respective embodiments will be described below in details by way of an example:

As illustrated in FIG. 6, in the scenario, there are five carriers $C_1$, $C_2$, $C_3$, $C_4$, and $C_5$ aggregated in the system, where the $C_1$ is a PCC of the UE, and the eNB groups them into three sets of carriers, where $S_1 = \{C_1, C_2\}$, $S_2 = \{(C_3, C_4\}$, and $S_3 = \{C_5\}$, and determines that an uplink carrier used to transmit UCI for the set $S_1$ of carriers is $C_{UL,1}$, ACK/NACK is fed back in uplink subframes 2 and 7, and there is corresponding $M_1 = 4$; an uplink carrier used to transmit UCI for the set $S_2$ is $C_{UL,4}$, ACK/NACK is fed back in uplink subframes 2 and 3, and there is corresponding $M_2 = 4$; and an uplink carrier used to transmit UCI for the set $S_3$ is $C_{UL,5}$, ACK/NACK is fed back in all of uplink subframes 0 to 9, and there is corresponding $M_3 = 1$. In this scenario, the uplink carriers $C_{UL,1}$, $C_{UL,4}$, and $C_{UL,5}$ are configured respectively by higher-layer signaling with carrier and UE specific parameters $\Delta_{F\_PUCCH,c}(F)$ and $\Delta_{TxD,c}(F')$, a UE-common carrier-specific parameter $P_{O\_NOMINAL\_PUCCH,c}$ for the carrier, and UE specific PUCCH initial power $P_{O\_UE\_PUCCH,c}$ for the carrier, $\Delta_{F\_PUCCH,c}(F)$ is configured respectively based upon a PUCCH format configured for a different UE on the $C_{UL,1}$, $C_{UL,4}$, and $C_{UL,5}$, and $\Delta_{TxD,c}(F')$ is configured respectively based upon the number of transmission antenna ports in the PUCCH format configured for the different UE on the $C_{UL,1}$, $C_{UL,4}$, and $C_{UL,5}$.

The UE determines the power adjustment cumulative amount in the methods according to the respective embodiments in respective scenarios:

In a first transmission approach, UCI of each set of carriers is transmitted respective via a PUCCH on an uplink carrier corresponding to the set of carriers (i.e., a predefined or preconfigured uplink carrier on which UCI of the set of carriers is transmitted via a PUCCH), that is, one uplink carrier used to transmit UCI via a PUCCH for one set of carriers is only used to transmit UCI of the one set of carriers via the PUCCH, and UCI of each set of carriers is transmitted in one corresponding PUCCH in one uplink subframe, that is, a plurality of PUCCHs can be transmitted concurrently in one uplink subframe;

If UCI corresponding to the set $S_1$ of carriers is transmitted via a PUCCH on the $C_{UL,1}$ in the subframes 2 and 8, then:

In a first method (corresponding to the method in the first embodiment above), $\delta_{PUCCH}$ corresponding to TPC commands in respective PDCCHs/EPDCCHs, in which TPC fields do not indicate any ACK/NACK resource, transmitted in $M_1=4$ downlink subframes on the downlink carrier $C_1$ (i.e., the dedicated carrier) in the set $S_1$ of carriers are summed up, and further added to $g(i-1)$ in the uplink subframe preceding the current subframe, resulting in the power adjustment cumulative amount of the PUCCH;

In a second method (corresponding to the method in the second embodiment above), if TPC commands transmitted in PDCCHs/EPDCCHs on the downlink carriers $C_1$ and $C_2$ in the set $S_1$ of carriers in the same downlink subframe are the same, and each of $M_1=4$ downlink subframes, in which a PDCCH/EPDCCH, including a TPC field which does not indicate any ACK/NACK resource, is received, corresponds to only one TPC command, which is a TPC command in the PDCCH/EPDCCH, including the TPC command, transmitted on any one downlink carrier in the subframe, then $\delta_{PUCCH}$ corresponding to the respective TPC commands corresponding to the M respective downlink subframes are summed up, and further added to $g(i-1)$ in the uplink subframe preceding the current subframe, resulting in the power adjustment cumulative amount of the PUCCH, where the downlink carriers selected in the respective downlink subframes may be different, that is, as long as the PDCCH/EPDCCH including the TPC command is received on either of the downlink carriers $C_1$ and $C_2$ in the downlink subframe, $\delta_{PUCCH}$ corresponding to the TPC command is cumulated, and only one TPC command is cumulated in one downlink subframe; and In a third method (corresponding to the method in the third embodiment above), when all of TPC commands can indicate a power adjustment cumulative amount when using EPDCCH scheduling, $\delta_{PUCCH}$ corresponding to TPC commands in respective PDCCHs/EPDCCHs, in which TPC fields do not indicate any ACK/NACK resource, transmitted in $M_1=4$ downlink subframes on the downlink carriers $C_1$ and $C_2$ in the set $S_1$ of carriers are summed up, and further added to $g(i-1)$ in the uplink subframe preceding the current subframe, resulting in the power adjustment cumulative amount of the PUCCH;

If UCI corresponding to the set $S_2$ of carriers is transmitted via a PUCCH on the $C_{UL,4}$ in the subframes 2 and 3, then:

In a first method (corresponding to the method in the first embodiment above), $\delta_{PUCCH}$ corresponding to TPC commands in respective PDCCHs/EPDCCHs, in which TPC fields do not indicate any ACK/NACK resource, transmitted in $M_2=4$ downlink subframes on the downlink carrier $C_3$ (i.e., the dedicated carrier) in the set $S_2$ of carriers are summed up, and further added to $g(i-1)$ in the uplink subframe preceding the current subframe, resulting in the power adjustment cumulative amount of the PUCCH;

In a second method (corresponding to the method in the second embodiment above), if TPC commands transmitted in PDCCHs/EPDCCHs on the downlink carriers $C_3$ and $C_4$ in the set $S_2$ of carriers in the same downlink subframe are the same, and each of $M_2=4$ downlink subframes, in which a PDCCH/EPDCCH, including a TPC field which does not indicate any ACK/NACK resource, is received, corresponds to only one TPC command, which is a TPC command in the PDCCH/EPDCCH, including the TPC command, transmitted on any one downlink carrier in the subframe, then $\delta_{PUCCH}$ corresponding to the respective TPC commands corresponding to the M respective downlink subframes are summed up, and further added to $g(i-1)$ in the uplink subframe preceding the current subframe, resulting in the power adjustment cumulative amount of the PUCCH, where the downlink carriers dedicated in the respective downlink subframes may be different, that is, as long as the PDCCH/EPDCCH including the TPC command is received on either of the downlink carriers $C_3$ and $C_4$ in the downlink subframe, $\delta_{PUCCH}$ corresponding to the TPC command is cumulated, and only one TPC command is cumulated in one downlink subframe; and In a third method (corresponding to the method in the third embodiment above), when all of TPC commands can indicate a power adjustment cumulative amount when using EPDCCH scheduling, $\delta_{PUCCH}$ corresponding to TPC commands in respective PDCCHs/EPDCCHs, in which TPC fields do not indicate any ACK/NACK resource, transmitted in $M_2=4$ downlink subframes on the downlink carriers $C_3$ and $C_4$ in the set $S_2$ of carriers are summed up, and further added to $g(i-1)$ in the uplink subframe preceding the current subframe, resulting in the power adjustment cumulative amount of the PUCCH;

If UCI corresponding to the set $S_3$ of carriers is transmitted via a PUCCH on the $C_{UL,5}$ in the subframes 0 to 9, then:

In a first/second/third method, $\delta_{PUCCH}$ corresponding to TPC commands in respective PDCCHs/EPDCCHs, in which TPC fields do not indicate any ACK/NACK resource, transmitted in a $M_3=1$ downlink subframe on the downlink carrier $C_5$ (i.e., the dedicated carrier in the first method, and any one carrier in the second method) in the set $S_3$ of carriers are summed up, and further added to $g(i-1)$ in the uplink subframe preceding the current subframe, resulting in the power adjustment cumulative amount of the PUCCH.

In a second transmission approach, the UE determines that an order of priorities of the sets of carriers is $S_1$ higher than $S_2$ than $S_3$, and UCI corresponding to a plurality of sets of carriers is transmitted concurrently via a PUCCH on the $C_{UL,1}$ corresponding to the set of carriers at the highest priority in each subframe, that is, in one uplink subframe, a PUCCH, which can carry UCI of a plurality of sets of carriers, is transmitted only on one uplink carrier used to transmit UCI via the PUCCH for one set of carriers;

If UCI corresponding to the sets $S_1$, $S_2$ and $S_3$ of carriers is transmitted concurrently via a PUCCH on the $C_{UL,1}$ in the subframe 2, then:

In a fourth method (corresponding to the method in the fourth embodiment), one of the sets $S_1$, $S_2$ and $S_3$ of carriers is selected (or determined), for example, the set $S_1$ of carriers is selected as predefined or higher-layer configured, $\delta_{PUCCH}$ corresponding to TPC commands in respective PDCCHs/EPDCCHs, in which TPC fields do not indicate any ACK/NACK resource, transmitted in $M_1$=4 downlink subframes on the downlink carrier $C_1$ (i.e., the specified carrier) in the set $S_1$ of carriers are summed up, and further added to g(i−1) in the uplink subframe preceding the current subframe, resulting in the power adjustment cumulative amount of the PUCCH:

In a fifth method (corresponding to the method in the fifth embodiment), one of the sets $S_1$, $S_2$ and $S_3$ of carriers is selected, for example, the set $S_1$ of carriers is selected as predefined or higher-layer configured, if TPC commands transmitted in PDCCHs/EPDCCHs on the respective downlink carriers among the respective sets of carriers in the same downlink subframe are the same, and each of $M_1$=4 downlink subframes, in which a PDCCH/EPDCCH, including a TPC field which does not indicate any ACK/NACK resource, is received on the set $S_1$ of carriers, corresponds to only one TPC command, which is a TPC command in a PDCCH/EPDCCH transmitted on any one downlink carrier among the set $S_1$ of carriers in the subframe, then $\delta_{PUCCH}$ corresponding to the respective TPC commands corresponding to the $M_1$=4 respective downlink subframes of the set $S_1$ of carriers are summed up, and further added to g(i−1) in the uplink subframe preceding the current subframe, resulting in the power adjustment cumulative amount of the PUCCH, where the downlink carriers selected in the respective downlink subframes may be different, that is, as long as the PDCCH/EPDCCH including the TPC command is received on either of the downlink carriers $C_1$ and $C_2$ in the downlink subframe, $\delta_{PUCCH}$ corresponding to the TPC command is cumulated, and only one TPC command is cumulated in one downlink subframe;

In a sixth method (corresponding to the method in the sixth embodiment above), one of the sets $S_1$, $S_2$ and $S_3$ of carriers is selected, for example, the set $S_1$ of carriers is selected as predefined or higher-layer configured, and $\delta_{PUCCH}$ corresponding to TPC commands in respective PDCCHs/EPDCCHs, in which TPC fields do not indicate any ACK/NACK resource, transmitted in $M_1$=4 downlink subframes on the downlink carriers $C_1$ and $C_2$ in the set $S_1$ of carriers are summed up, and further added to g(i−1) in the uplink subframe preceding the current subframe, resulting in the power adjustment cumulative amount of the PUCCH;

In a seventh method (corresponding to the method in the seventh embodiment above), $\delta_{PUCCH}$ corresponding to TPC commands in respective PDCCHs/EPDCCHs, in which TPC fields do not indicate any ACK/NACK resource, transmitted in $M_1$=4 downlink subframes on the downlink carrier $C_1$ (i.e., the specified carrier) in the set $S_1$ of carriers, in $M_2$=4 downlink subframes on the downlink carrier $C_3$ (i.e., the specified carrier) in the set $S_2$ of carriers, and in $M_3$=1 downlink subframe on the downlink carrier $C_5$ (i.e., the specified carrier) in the set $S_3$ of carriers are summed up, and further added to g(i−1) in the uplink subframe preceding the current subframe, resulting in the power adjustment cumulative amount of the PUCCH;

In an eighth method (corresponding to the method in the eighth embodiment above), if TPC commands transmitted in PDCCHs/EPDCCHs on the downlink carriers $C_1$ and $C_2$ in the set $S_1$ of carriers in the same downlink subframe are the same, and each of $M_1$=4 downlink subframes, in which a PDCCH/EPDCCH, including a TPC field which does not indicate any ACK/NACK resource, is received on the set $S_1$ of carriers, corresponds to only one TPC command, which is a TPC command in a PDCCH/EPDCCH transmitted on any one downlink carrier among the set $S_1$ of carriers in the subframe, each of $M_2$=4 downlink subframes, in which a PDCCH/EPDCCH, including a TPC field which does not indicate any ACK/NACK resource, is received on the set $S_2$ of carriers, corresponds to only one TPC command, which is a TPC command in a PDCCH/EPDCCH transmitted on any one downlink carrier among the set $S_2$ of carriers in the subframe, and an $M_3$=1 downlink subframe, in which a PDCCH/EPDCCH, including a TPC field which does not indicate any ACK/NACK resource, is received on the set $S_3$ of carriers, corresponds to only one TPC command, which is a TPC command in a PDCCH/EPDCCH transmitted on the downlink carrier $C_5$ in the set $S_3$ of carriers in the subframe, then $\delta_{PUCCH}$ corresponding to the respective TPC commands corresponding to the $M_1$=4 respective downlink subframes of the set $S_1$ of carriers, the respective TPC commands corresponding to the $M_2$=4 respective downlink subframes of the set $S_2$ of carriers, and the TPC command corresponding to the $M_3$=1 downlink subframe on the downlink carrier $C_5$ in the set $S_3$ of carriers are summed up, and further added to g(i−1) in the uplink subframe preceding the current subframe, resulting in the power adjustment cumulative amount of the PUCCH, where the downlink carriers selected in the respective downlink subframes of each set of carriers may be different, and only one TPC command is cumulated in one downlink subframe;

In a ninth method (corresponding to the method in the ninth embodiment above), if all of TPC commands transmitted in PDCCHs/EPDCCHs on the downlink carriers $C_1$ and $C_2$ in the set $S_1$ of carriers, PDCCHs/EPDCCHs on the downlink carriers $C_3$ and $C_4$ in the set $S_2$ of carriers, and a PDCCH/EPDCCH on the downlink carrier $C_5$ in the set $S_3$ of carriers in the same downlink subframe are the same, and each of M=max($M_1$, $M_2$, $M_3$)=4 downlink subframes, in which a PDCCH/EPDCCH, including a TPC field which does not indicate any ACK/NACK resource, is received on the sets $S_1$, $S_2$ and $S_3$ of carriers, corresponds to at most one TPC command, which is a TPC command in a PDCCH/EPDCCH transmitted on any one downlink carrier among the sets $S_1$, $S_2$ and $S_3$ of carriers, then respective $\delta_{PUCCH}$ corresponding to the TPC commands obtained in the M=4 respective downlink subframes are summed up, and further added to g(i−1) in the uplink subframe preceding the current subframe, resulting in the power adjustment cumulative amount of the PUCCH, where the downlink carriers selected in the respective downlink subframes may be different, and only one TPC command is cumulated in one downlink subframe; and In a tenth method (corresponding to the method in the tenth embodiment above), $\delta_{PUCCH}$ corresponding to TPC commands in respective PDCCHs/EPDCCHs, in which TPC fields do not indicate any ACK/NACK resource, transmitted in $M_1$=4 downlink subframes on the downlink carriers $C_1$ and $C_2$ in the set $S_1$ of carriers, in $M_2$=4 downlink subframes on the downlink carriers $C_3$ and $C_4$ in the set $S_2$ of carriers, and in a $M_3$=1 downlink subframe on the downlink carrier $C_5$ in the set $S_3$ of carriers are summed up, and further added to g(i−1) in the uplink subframe preceding the current subframe, resulting in the power adjustment cumulative amount of the PUCCH;

If UCI corresponding to the sets $S_2$ and $S_3$ of carriers is transmitted concurrently via a PUCCH on the $C_{UL,4}$ in the subframe 3, then:

In a fourth method (corresponding to the method in the fourth embodiment), one of the sets $S_2$ and $S_3$ of carriers is selected, for example, the set $S_2$ of carriers is selected as predefined or higher-layer configured, $\delta_{PUCCH}$ corresponding to TPC commands in respective PDCCHs/EPDCCHs, in which TPC fields do not indicate any ACK/NACK resource, transmitted in $M_2$=4 downlink subframes on the downlink carrier $C_3$ (i.e., the specified carrier) in the set $S_2$ of carriers are summed up, and further added to g(i−1) in the uplink subframe preceding the current subframe, resulting in the power adjustment cumulative amount of the PUCCH;

In a fifth method (corresponding to the method in the fifth embodiment), one of the sets $S_2$ and $S_3$ of carriers is selected, for example, the set $S_2$ of carriers is selected as predefined or higher-layer configured, if TPC commands transmitted in PDCCHs/EPDCCHs on the respective downlink carriers among the respective sets of carriers in the same downlink subframe are the same, and each of $M_2$=4 downlink subframes, in which a PDCCH/EPDCCH, including a TPC field which does not indicate any ACK/NACK resource, is received on the set $S_2$ of carriers, corresponds to only one TPC command, which is a TPC command in a PDCCH/EPDCCH transmitted on any one downlink carrier among the set $S_2$ of carriers in the subframe, then $\delta_{PUCCH}$ corresponding to the respective TPC commands corresponding to the $M_2$=4 respective downlink subframes of the set $S_2$ of carriers are summed up, and further added to g(i−1) in the uplink subframe preceding the current subframe, resulting in the power adjustment cumulative amount of the PUCCH, where the downlink carriers selected in the respective downlink subframes may be different, that is, as long as the PDCCH/EPDCCH including the TPC command is received on either of the downlink carriers $C_3$ and $C_4$ in the downlink subframe, $\delta_{PUCCH}$ corresponding to the TPC command is cumulated, and only one TPC command is cumulated in one downlink subframe;

In a sixth method (corresponding to the method in the sixth embodiment above), one of the sets $S_2$ and $S_3$ of carriers is selected, for example, the set $S_2$ of carriers is selected as predefined or higher-layer configured, and $\delta_{PUCCH}$ corresponding to TPC commands in respective PDCCHs/EPDCCHs, in which TPC fields do not indicate any ACK/NACK resource, transmitted in $M_2$=4 downlink subframes on the downlink carriers $C_3$ and $C_4$ in the set $S_2$ of carriers are summed up, and further added to g(i−1) in the uplink subframe preceding the current subframe, resulting in the power adjustment cumulative amount of the PUCCH;

In a seventh method (corresponding to the method in the seventh embodiment above), $\delta_{PUCCH}$ corresponding to TPC commands in respective PDCCHs/EPDCCHs, in which TPC fields do not indicate any ACK/NACK resource, transmitted in $M_2$=4 downlink subframes on the downlink carrier $C_3$ (i.e., the specified carrier) in the set $S_2$ of carriers, and in a $M_3$=1 downlink subframe on the downlink carrier $C_5$ (i.e., the specified carrier) in the set $S_3$ of carriers are summed up, and further added to g(i−1) in uplink subframe preceding the current subframe, resulting in the power adjustment cumulative amount of the PUCCH;

In an eighth method (corresponding to the method in the eighth embodiment above), if TPC commands transmitted in PDCCHs/EPDCCHs on the downlink carriers $C_3$ and $C_4$ in the set $S_2$ of carriers in the same downlink subframe are the same, and each of $M_2$=4 downlink subframes, in which a PDCCH/EPDCCH, including a TPC field which does not indicate any ACK/NACK resource, is received on the set $S_2$ of carriers, corresponds to only one TPC command, which is a TPC command in a PDCCH/EPDCCH transmitted on any one downlink carrier among the set $S_2$ of carriers in the subframe, and an $M_3$=1 downlink subframe, in which a PDCCH/EPDCCH, including a TPC field which does not indicate any ACK/NACK resource, is received on the set $S_3$ of carriers, corresponds to only one TPC command, which is a TPC command in a PDCCH/EPDCCH transmitted on the downlink carrier $C_5$ in the subframe, then $\delta_{PUCCH}$ corresponding to the respective TPC commands corresponding to the $M_2$=4 respective downlink subframes of the set $S_2$ of carriers, and the TPC command corresponding to the $M_3$=1 downlink subframe on the downlink carrier $C_5$ in the set $S_3$ of carriers are summed up, and further added to g(i−1) in the uplink subframe preceding the current subframe, resulting in the power adjustment cumulative amount of the PUCCH, where the downlink carriers selected in the respective downlink subframes of each set of carriers may be different, and only one TPC command is cumulated in one downlink subframe:

In a ninth method (corresponding to the method in the ninth embodiment above), if all of TPC commands transmitted in PDCCHs/EPDCCHs on the downlink carriers $C_3$ and $C_4$ in the set $S_2$ of carriers, and in PDCCH/EPDCCH on the downlink carrier $C_5$ in the set $S_3$ of carriers in the same downlink subframe are the same, and each of M=max($M_2$, $M_3$)=4 downlink subframes, in which a PDCCH/EPDCCH, including a TPC field which does not indicate any ACK/NACK resource, is received on the sets $S_2$ and $S_3$ of carriers, corresponds to at most one TPC command, which is a TPC command in a PDCCH/EPDCCH transmitted on any one downlink carrier among the sets $S_2$ and $S_3$ of carriers, then respective $\delta_{PUCCH}$ corresponding to the TPC commands obtained in the M=4 respective downlink subframes are summed up, and further added to g(i−1) in the uplink subframe preceding the current subframe, resulting in the power adjustment cumulative amount of the PUCCH, where the downlink carriers selected in the respective downlink subframes may be different, and only one TPC command is cumulated in one downlink subframe;

In a tenth method (corresponding to the method in the tenth embodiment above), $\delta_{PUCCH}$ corresponding to TPC commands in respective PDCCHs/EPDCCHs, in which TPC fields do not indicate any ACK/NACK resource, transmitted in $M_2$=4 downlink subframes on the downlink carriers $C_3$ and $C_4$ in the set $S_2$ of carriers, and in $M_3$=1 downlink subframe on the downlink carrier $C_5$ in the set $S_3$ of carriers are summed up, and further added to g(i−1) in the uplink subframe preceding the current subframe, resulting in the power adjustment cumulative amount of the PUCCH;

If UCI corresponding to the sets $S_1$ and $S_3$ of carriers is transmitted concurrently via a PUCCH on the $C_{UL,1}$ in the subframe 8, then:

In a fourth method (corresponding to the method in the fourth embodiment), one of the sets $S_1$ and $S_3$ of carriers is selected, for example, the set $S_1$ of carriers is selected as predefined or higher-layer configured. $\delta_{PUCCH}$ corresponding to TPC commands in respective PDCCHs/EPDCCHs, in which TPC fields do not indicate any ACK/NACK resource, transmitted in $M_1$=4 downlink subframes on the downlink carrier $C_1$ (i.e., the specified carrier) in the set $S_1$ of carriers are summed up, and further added to g(i−1) in the uplink subframe preceding the current subframe, resulting in the power adjustment cumulative amount of the PUCCH;

In a fifth method (corresponding to the method in the fifth embodiment), one of the sets $S_1$ and $S_3$ of carriers is selected, for example, the set $S_1$ of carriers is selected as predefined or higher-layer configured, if TPC commands transmitted in PDCCHs/EPDCCHs on the respective downlink carriers among the respective sets of carriers in the same downlink subframe are the same, and each of $M_1=4$ downlink subframes, in which a PDCCH/EPDCCH, including a TPC field which does not indicate any ACK/NACK resource, is received on the set $S_1$ of carriers, corresponds to only one TPC command, which is a TPC command in a PDCCH/EPDCCH transmitted on any one downlink carrier among the set $S_1$ of carriers in the subframe, then $\delta_{PUCCH}$ corresponding to the respective TPC commands corresponding to the $M_1=4$ respective downlink subframes of the set $S_1$ of carriers are summed up, and further added to $g(i-1)$ in the uplink subframe preceding the current subframe, resulting in the power adjustment cumulative amount of the PUCCH, where the downlink carriers selected in the respective downlink subframes may be different, that is, as long as the PDCCH/EPDCCH including the TPC command is received on either of the downlink carriers $C_1$ and $C_2$ in the downlink subframe, $\delta_{PUCCH}$ corresponding to the TPC command is cumulated, and only one TPC command is cumulated in one downlink subframe;

In a sixth method (corresponding to the method in the sixth embodiment above), one of the sets $S_1$ and $S_3$ of carriers is selected, for example, the set $S_1$ of carriers is selected as predefined or higher-layer configured, and $\delta_{PUCCH}$ corresponding to TPC commands in respective PDCCHs/EPDCCHs, in which TPC fields do not indicate any ACK/NACK resource, transmitted in $M_1=4$ downlink subframes on the downlink carriers $C_1$ and $C_2$ in the set $S_1$ of carriers are summed up, and further added to $g(i-1)$ in the uplink subframe preceding the current subframe, resulting in the power adjustment cumulative amount of the PUCCH;

In a seventh method (corresponding to the method in the seventh embodiment above), $\delta_{PUCCH}$ corresponding to TPC commands in respective PDCCHs/EPDCCHs, in which TPC fields do not indicate any ACK/NACK resource, transmitted in $M_1=4$ downlink subframes on the downlink carrier $C_1$ (i.e., the specified carrier) in the set $S_1$ of carriers, and in a $M_3=1$ downlink subframe on the downlink carrier $C_5$ (i.e., the specified carrier) in the set $S_3$ of carriers are summed up, and further added to $g(i-1)$ in the uplink subframe preceding the current subframe, resulting in the power adjustment cumulative amount of the PUCCH;

In an eighth method (corresponding to the method in the eighth embodiment above), if TPC commands transmitted in PDCCHs/EPDCCHs on the downlink carriers $C_1$ and $C_2$ in the set $S_1$ of carriers in the same downlink subframe are the same, and each of $M_1=4$ downlink subframes, in which a PDCCH/EPDCCH, including a TPC field which does not indicate any ACK/NACK resource, is received on the set $S_1$ of carriers, corresponds to only one TPC command, which is a TPC command in a PDCCH/EPDCCH transmitted on any one downlink carrier among the set $S_1$ of carriers in the subframe, and an $M_3=1$ downlink subframe, in which a PDCCH/EPDCCH, including a TPC field which does not indicate any ACK/NACK resource, is received on the set $S_3$ of carriers, corresponds to only one TPC command, which is a TPC command in a PDCCH/EPDCCH transmitted on the downlink carrier $C_5$ in the subframe, then $\delta_{PUCCH}$ corresponding to the respective TPC commands corresponding to the $M_1=4$ respective downlink subframes of the set $S_1$ of carriers, and the TPC command corresponding to the $M_3=1$ downlink subframe on the downlink carrier $C_5$ in the set $S_3$ of carriers are summed up, and further added to $g(i-1)$ in the uplink subframe preceding the current subframe, resulting in the power adjustment cumulative amount of the PUCCH, where the downlink carriers selected in the respective downlink subframes of each set of carriers may be different, and only one TPC command is cumulated in one downlink subframe;

In a ninth method (corresponding to the method in the ninth embodiment above), if all of TPC commands transmitted in PDCCHs/EPDCCHs on the downlink carriers $C_1$ and $C_2$ in the set $S_1$ of carriers, and a PDCCH/EPDCCH on the downlink carrier $C_5$ in the set $S_3$ of carriers in the same downlink subframe are the same, and each of $M=\max(M_1, M_3)=4$ downlink subframes, in which a PDCCH/EPDCCH, including a TPC field which does not indicate any ACK/NACK resource, is received on the sets $S_1$ and $S_3$ of carriers, corresponds to at most one TPC command, which is a TPC command in a PDCCH/EPDCCH transmitted on any one downlink carrier among the sets $S_1$ and $S_3$ of carriers, then respective $\delta_{PUCCH}$ corresponding to the TPC commands obtained in the $M=4$ respective downlink subframes are summed up, and further added to $g(i-1)$ in the uplink subframe preceding the current subframe, resulting in the power adjustment cumulative amount of the PUCCH, where the downlink carriers selected in the respective downlink subframes may be different, and only one TPC command is cumulated in one downlink subframe;

In a tenth method (corresponding to the method in the tenth embodiment above), $\delta_{PUCCH}$ corresponding to TPC commands in respective PDCCHs/EPDCCHs, in which TPC fields do not indicate any ACK/NACK resource, transmitted in $M_1=4$ downlink subframes on the downlink carriers $C_1$ and $C_2$ in the set $S_1$ of carriers, and in a $M_3=1$ downlink subframe on the downlink carrier $C_5$ in the set $S_3$ of carriers are summed up, and further added to $g(i-1)$ in the uplink subframe preceding the current subframe, resulting in the power adjustment cumulative amount of the PUCCH;

If UCI corresponding to the set $S_3$ of carriers is transmitted via a PUCCH on the $C_{UL,5}$ in the subframes 0, 1, 4, 5, 6, 7 and 9, then the PUCCH in any of the methods is the same as the PUCCH on the $C_{UL,5}$ in the first transmission approach; and In a third transmission approach, the UE determines that an order of priorities of the sets of carriers is $S_1$ higher than $S_2$ and $S_2$ equal to $S_3$, and when there is no PUCCH on $C_{UL,1}$ corresponding to the set of carriers with more higher priority, UCI of the sets carriers at the same priority is transmitted respectively on the uplink carriers $C_{UL,4}$ and $C_{UL,5}$ corresponding to the respective sets carriers, that is, in one uplink subframe, a PUCCH, which can carry UCI of a plurality of sets of carriers, may be transmitted only on one uplink carrier used to transmit UCI via the PUCCH for one set of carriers, or a plurality of PUCCHs respectively carrying UCI of their corresponding different sets of carriers may be transmitted;

If UCI corresponding to the sets $S_1$, $S_2$ and $S_3$ of carriers is transmitted concurrently via a PUCCH on the $C_{UL,1}$ in the subframe 2, then reference can be made to the description in the second transmission approach above for details thereof;

If UCI corresponding to the set $S_2$ of carriers is transmitted via a PUCCH on the $C_{UL,4}$, and UCI corresponding to the set $S_3$ of carriers is transmitted via a PUCCH on the $C_{UL,5}$, respectively in the subframe 3, then reference can be made to the description in the first transmission approach above for details thereof;

If UCI corresponding to the sets $S_1$ and $S_3$ of carriers is transmitted concurrently via a PUCCH on the $C_{UL,1}$ in the subframe 8, then reference can be made to the description in the second transmission approach above for details thereof; and If UCI corresponding to the set $S_3$ of carriers is transmitted via a PUCCH on the $C_{UL,5}$ in the subframes 0, 1, 4, 5, 6, 7 and 9, then the PUCCH in any of the methods is the same as the PUCCH on the $C_{UL,5}$ in the first transmission approach.

Figure 7:
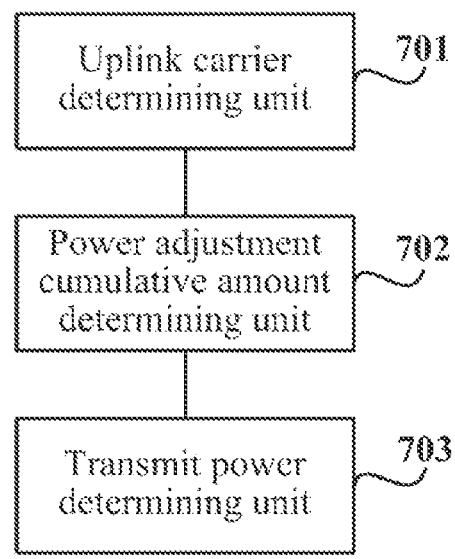
FIG. 7 illustrates a schematic structural diagram of a device for controlling PUCCH power according to an embodiment of the invention.

An embodiment of the invention further correspondingly provides a device for controlling PUCCH power, as illustrated in FIG. 7, the device including:

An uplink carrier determining unit 701 is configured to determine one or more uplink carriers for which PUCCH transmission in a current uplink subframe, where the one or more uplink carriers are at least one of uplink carriers used to transmit UCI via PUCCHs for respective sets of carriers of a UE, each set of carriers of the UE corresponds to one of the uplink carriers used to transmit UCI, and the uplink carriers used to transmit corresponding to different sets of carriers are different from each other;

A power adjustment cumulative amount determining unit 702 is configured to determine a power adjustment cumulative amount corresponding to a PUCCH to be transmitted on each of one or more uplink carriers for PUCCH transmission in the current uplink subframe, based upon at least one TPC command received on at least one downlink carrier among at least one set of carriers for which UCI is to be transmitted via the PUCCH on the each of one or more uplink carriers in the current uplink subframe; and A transmit power determining unit 703 is configured to determine transmit power of the PUCCH to be transmitted on the each of the one or more uplink carriers for PUCCH transmission in the current uplink subframe, based upon PUCCH power control parameters corresponding to the each of the one or more uplink carriers and the power adjustment cumulative amount corresponding to the each of the one or more uplink carriers.

The uplink carrier determining unit 701 is further configured:

Before the one or more uplink carriers for PUCCH transmission in the current uplink subframe are determined, to determine that N configured carriers for the UE are grouped into A sets of carriers and to determine the uplink carrier used to transmit a UCI via PUCCHs for the respective sets of carriers according to a received configuration information transmitted by the network side or as predefined with the network side, where 1≤A≤N, and each set of carriers comprises at least one carrier.

The power adjustment cumulative amount determining unit 702 configured to determine the power adjustment cumulative amount corresponding to the PUCCH to be transmitted on the each of the one or more uplink carriers for PUCCH transmission in the current uplink subframe, based upon the at least one TPC command received on the at least one downlink carrier among the at least one set of carriers for which UCI is to be transmitted via the PUCCH on the each of the one or more uplink carriers in the current uplink subframe is configured:

To determine that the power adjustment cumulative amount g(i) corresponding to the PUCCH to be transmitted on the each of the one or more uplink carriers in the current uplink subframe i is the sum of power adjustment amounts $\delta_{PUCCH}$ respectively indicated by PDCCHs/EPDCCHs received, on the at least one downlink carrier among the at least one set of carriers in M downlink subframes of the at least one set of carriers and a power adjustment cumulative amount g(i−1) corresponding to a PUCCH on the each of the one or more uplink carriers in a uplink subframe preceding the current uplink subframe, where the power adjustment amounts $\delta_{PUCCH}$ are indicated respectively by TPC commands carried in the PDCCHs/EPDCCHs, and M represents the number of downlink subframes, in each set of the at least one set of carriers for which UCI is to be transmitted via the PUCCH on the each of the one or more uplink carriers, for which ACK/NACK of downlink data needs to be fed back in the current uplink subframe i.

Particularly the power adjustment amounts $\delta_{PUCCH}$ respectively indicated by the PDCCHs/EPDCCHs received, on the at least one downlink carrier among the at least one set of carriers, in the M downlink subframes of the at least one set of carriers comprise:

power adjustment amounts $\delta_{PUCCH}$ respectively indicated by PDCCHs/EPDCCHs received, on one downlink carrier dedicated in one set of carriers for which UCI is to be transmitted via the PUCCH on the uplink carrier, in M downlink subframes of the set of carriers; or power adjustment amounts $\delta_{PUCCH}$ respectively indicated by PDCCHs/EPDCCHs received, on any one downlink carrier among one set of carriers for which UCI is to be transmitted via the PUCCH on the uplink carrier, in M downlink subframes of the set of carriers; or power adjustment amounts $\delta_{PUCCH}$ respectively indicated by PDCCHs/EPDCCHs received, on all downlink carriers of one set of carriers for which UCI is to be transmitted via the PUCCH on the uplink carrier, in M downlink subframes of the set of carriers; or power adjustment amounts $\delta_{PUCCH}$ respectively indicated by PDCCHs/EPDCCHs received, on one downlink carrier dedicated in one set of carriers determined among a plurality of sets of carriers for which UCI is to be transmitted via the PUCCH on the uplink carrier, in M downlink subframes of the determined one set of carriers; or power adjustment amounts $\delta_{PUCCH}$ respectively indicated by PDCCHs/EPDCCHs received, on any one downlink carrier among one set of carriers determined among a plurality of sets of carriers for which UCI is to be transmitted via the PUCCH on the uplink carrier, in M downlink subframes of the determined one set of carriers; or power adjustment amounts $\delta_{PUCCH}$ respectively indicated by PDCCHs/EPDCCHs received, on all downlink carriers of one set of carriers determined among a plurality of sets of carriers for which UCI is to be transmitted via the PUCCH on the uplink carrier, in M downlink subframes of the determined one set of carriers; or power adjustment amounts $\delta_{PUCCH}$ respectively indicated by PDCCHs/EPDCCHs received, on one downlink carrier dedicated in each of a plurality of sets of carriers for which UCI is to be transmitted via the PUCCH on the uplink carrier, in M downlink subframes of the each of the plurality sets of carriers; or power adjustment amounts $\delta_{PUCCH}$ respectively indicated by PDCCHs/EPDCCHs received, on any one downlink carrier among each of a plurality of sets of carriers for which UCI is to be transmitted via the PUCCH on the uplink carrier, in M downlink subframes of the each of the plurality sets of carriers; or power adjustment amounts $\delta_{PUCCH}$ respectively indicated by PDCCHs/EPDCCHs received, on any one downlink carrier among a plurality of sets of carriers for which UCI is to be transmitted via the PUCCH on the uplink carrier, in M downlink subframes of the plurality of sets of carriers; or power adjustment amounts $\delta_{PUCCH}$ respectively indicated by PDCCHs/EPDCCHs received, on all downlink carriers of each of a plurality of sets of carriers for which UCI is to be transmitted via the PUCCH on the uplink carrier, in M downlink subframes of the each of the plurality sets of carriers.

The power adjustment cumulative amount determining unit 702 is further configured:

To determine the dedicated one downlink carrier as such a downlink carrier among the one set of carriers that is paired with the each of the plurality uplink carriers.

The power adjustment cumulative amount determining unit 702 is further configured:

To determine the each of PDCCHs/EPDCCHs is a PDCCH/EPDCCH in which a TPC field is not reused to indicate ACK/NACK resource.

For the UE configured to transmit ACK/NACK in the PUCCH format 3, the power adjustment cumulative amount determining unit 702 is further configured:

To determine each of the PDCCHs/EPDCCHs as:

a PDCCH/EPDCCH transmitted on a Primary Component Carrier (PCC), and Downlink Assignments Index (DAI) value in the PDCCH/EPDCCH is equal to '1'; or a PDCCH/EPDCCH used to schedule the PCC, and the DAI value in the PDCCH/EPDCCH is equal to '1'; or a PDCCH/EPDCCH transmitted on a downlink carrier, paired with the each of the one or more uplink carriers, in each of the at least one set of carriers, and the DAI value in the PDCCH/EPDCCH is equal to '1'; or a PDCCH/EPDCCH used to schedule a downlink carrier, paired with the each of the one or more uplink carriers, in each of the at least one set of carriers, and the DAI value in the PDCCH/EPDCCH is equal to '1'; and For the UE configured to transmit ACK/NACK in the PUCCH format 1b with channel selection, the power adjustment cumulative amount determining unit 702 is further configured:

To determine each of the PDCCHs/EPDCCHs as:

A PDCCH/EPDCCH transmitted on a PCC; or

A PDCCH/EPDCCH transmitted on a downlink carrier, paired with the each of the one or more uplink carriers, in each of the at least one set of carriers.

The transmit power determining unit 703 is further configured:

To obtain the PUCCH power control parameters which are carrier specific parameters preconfigured by the network side through higher-layer signaling separately for each uplink carrier available for PUCCH transmission.

The transmit power determining unit 703 configured to obtain the PUCCH power control parameters is configured:

To obtain the following PUCCH power control parameters:

a carrier specific PUCCH initial power $P_{O\_NOMINAL\_PUCCH,c}$, a carrier and UE specific PUCCH initial power $P_{O\_UE\_PUCCH,c}$, a carrier and UE specific power offset $\Delta_{F\_PUCCH,c}(F)$ related to a PUCCH transmission format, and a carrier and UE specific power offset $\Delta_{TxD,c}(F')$ related to PUCCH transmission via two antenna ports, preconfigured by the network side through higher-layer signaling separately for each uplink carrier available for PUCCH transmission, where c represents a carrier index.

Here the UCI includes one or more of ACK/NACK, periodical CSI, and an SR.

Figure 8:
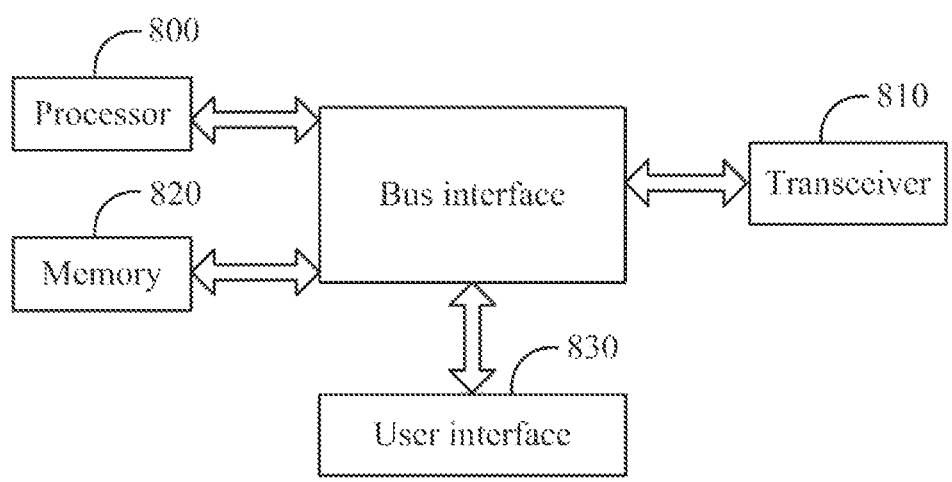
FIG. 8 illustrates a schematic structural diagram of another device for controlling PUCCH power according to an embodiment of the invention.

An embodiment of the invention further correspondingly provides a device for controlling PUCCH power, as illustrated in FIG. 8, the device including:

A processor 800 is configured to determine one or more uplink carrier for PUCCH transmission in a current uplink subframe, where the one or more uplink carriers are at least one of uplink carriers used to transmit UCI via PUCCHs for respective sets of carriers of a UE, each set of carriers of the UE corresponds to one of the uplink carriers used to transmit UCI, and the uplink carriers used to transmit UCI corresponding to different sets of carriers are different from each other; to determine a power adjustment cumulative amount corresponding to a PUCCH to be transmitted on each of the one or more uplink carriers for PUCCH transmission in the current uplink subframe, based upon at least one TPC command received on at least one downlink carrier among at least one set of carriers for which UCI is to be transmitted via the PUCCH on the each of the one or more uplink carriers in the current uplink subframe by a transceiver 810; and determine transmit power of the PUCCH to be transmitted on the each of the one or more uplink carriers for PUCCH transmission in the current uplink subframe, based upon PUCCH power control parameters corresponding to the each of the one or more uplink carrier and the power adjustment cumulative amount corresponding to the each of the one or more uplink carriers; and A transceiver 810 is configured to be controlled by the processor 800 to receive and transmit data.

Preferably the processor 800 is further configured:

Before the one or more uplink carrier for PUCCH transmission in the current uplink subframe are determined, to determine that N configured carriers of the UE are grouped into A sets of carriers, and to determine the uplink carriers used to transmit UCI via PUCCHs for the respective sets of carriers according to a received configuration information transmitted by the network side or as predefined with the network side, where 1≤A≤N, and each set of carriers includes at least one carrier.

Preferably the processor 800 configured to determine the power adjustment cumulative amount corresponding to the PUCCH to be transmitted on the each of the one or more uplink carriers for PUCCH transmission in the current uplink subframe, based upon the at least one TPC command received on the at least one downlink carrier among the at least one set of carriers for which UCI is to be transmitted via the PUCCH on the each of the one or more uplink carriers in the current uplink subframe is configured:

To determine that the power adjustment cumulative amount g(i) corresponding to the PUCCH to be transmitted on the each of the one or more uplink carriers in the current uplink subframe i is the sum of power adjustment amounts $\delta_{PUCCH}$ respectively indicated by PDCCHs/EPDCCHs received, on the at least one downlink carrier among the at least one set of carriers, in M downlink subframes of the at least one set of carriers and a power adjustment cumulative amount g(i−1) corresponding to a PUCCH on the each of the one or more uplink carriers in a uplink subframe preceding the current uplink subframe, where the power adjustment amount $\delta_{PUCCH}$ are indicated respectively by TPC commands carried in the PDCCHs/EPDCCHs, and M represents the number of downlink subframes, in the each of the at least one set of carriers for which UCI is to be transmitted via the PUCCH on the each of the one or more uplink carrier, for which ACK/NACK of downlink data needs to be fed back in the current uplink subframe i.

Preferably the processor 800 is configured to determine the power adjustment amounts as:

power adjustment amounts $\delta_{PUCCH}$ respectively indicated by PDCCHs/EPDCCHs received, on one downlink carrier dedicated in one set of carriers for which UCI is to be transmitted via the PUCCH on the each of the one or more uplink carriers, in M downlink subframes of the set of carriers; or power adjustment amounts $\delta_{PUCCH}$ respectively indicated by PDCCHs/EPDCCHs received, on any one downlink carrier among one set of carriers for which UCI is to be transmitted via the PUCCH on the each of the one or more uplink carriers, in M downlink subframes of the one set of carriers; or power adjustment amounts $\delta_{PUCCH}$ respectively indicated by PDCCHs/EPDCCHs received, on all downlink carriers of one set of carriers for which UCI is to be transmitted via the PUCCH on the each of the one or more uplink carriers, in M downlink subframes of the one set of carriers; or power adjustment amounts $\delta_{PUCCH}$ respectively indicated by PDCCHs/EPDCCHs received, on one downlink carrier dedicated in one set of carriers determined among a plurality of sets of carriers for which UCI is to be transmitted via the PUCCH on the each of the one or more uplink carriers, in M downlink subframes of the determined one set of carriers; or power adjustment amounts $\delta_{PUCCH}$ respectively indicated by PDCCHs/EPDCCHs received, on any one downlink carrier among one set of carriers determined among a plurality of sets of carriers for which UCI is to be transmitted via the PUCCH on the each of the one or more uplink carriers, in M downlink subframes of the determined one set of carriers; or power adjustment amounts $\delta_{PUCCH}$ respectively indicated by PDCCHs/EPDCCHs received, on all downlink carriers of one set of carriers determined among a plurality of sets of carriers for which UCI is to be transmitted via the PUCCH on the each of the one or more uplink carriers, in M downlink subframes of the determined one set of carriers; or power adjustment amounts $\delta_{PUCCH}$ respectively indicated by PDCCHs/EPDCCHs received, on one downlink carrier dedicated in each of a plurality of sets of carriers for which UCI is to be transmitted via the PUCCH on the each of the one or more uplink carriers, in M downlink subframes of the each of the plurality of sets of carriers; or power adjustment amounts $\delta_{PUCCH}$ respectively indicated by PDCCHs/EPDCCHs received, on any one downlink carrier among each of a plurality of sets of carriers for which UCI is to be transmitted via the PUCCH on the each of the one or more uplink carrier, in M downlink subframes of each of the plurality of the sets of carriers; or power adjustment amounts $\delta_{PUCCH}$ respectively indicated by PDCCHs/EPDCCHs received, on any one downlink carrier among a plurality of sets of carriers for which UCI is to be transmitted via the PUCCH on the each of the one or more uplink carriers, in M downlink subframes of the plurality of sets of carriers; or power adjustment amounts $\delta_{PUCCH}$ respectively indicated by PDCCHs/EPDCCHs received, on all downlink carriers of each of a plurality of sets of carriers for which UCI is to be transmitted via the PUCCH on the each of the one or more uplink carrier, in M downlink subframes of the each of the plurality of sets of carriers.

Preferably the processor 800 is further configured:

To determine the specified one downlink carrier as such a downlink carrier among the one set of carriers that is paired with the each of the one or more uplink carrier.

Preferably the processor 800 is further configured:

To determine each of the PDCCHs/EPDCCHs as a PDCCH/EPDCCH in which a TPC field is not reused to indicate ACK/NACK resource.

Preferably for the UE configured to transmit ACK/NACK in the PUCCH format 3, the processor 800 is further configured:

To determine each of the PDCCHs/EPDCCHs as:

a PDCCH/EPDCCH transmitted on a Primary Component Carrier (PCC), and Downlink Assignments Index (DAI) value in the PDCCH/EPDCCH is equal to '1' or a PDCCH/EPDCCH used to schedule the PCC, and the DAI value in the PDCCH/EPDCCH is equal to '1'; or a PDCCH/EPDCCH transmitted on a downlink carrier, paired with the each of the one or more uplink carriers, in each of the at least one set of carriers, and the DAI value in the PDCCH/EPDCCH is equal to '1' or a PDCCH/EPDCCH used to schedule a downlink carrier, paired with the each of the one or more uplink carriers, in each of the at least one set of carriers, and the DAI value in the PDCCH/EPDCCH is equal to '1'; and Preferably for the UE configured to transmit ACK/NACK in the PUCCH format 1b with channel selection, the processor 800 is further configured:

To determine each of the PDCCHs/EPDCCHs as:

A PDCCH/EPDCCH transmitted on a PCC; or

A PDCCH/EPDCCH transmitted on a downlink carrier, paired with the each of the one or more uplink carriers, in each of the at least one set of carriers.

Preferably the processor 800 is further configured:

To obtain the PUCCH power control parameters which are carrier specific parameters preconfigured by the network side through higher-layer signaling separately for each uplink carrier available for PUCCH t transmission.

Preferably the processor 800 is further configured:

To obtain the following PUCCH power control parameters:

a carrier specific PUCCH initial power $P_{O\_NOMINAL\_PUCCH,c}$, a carrier and UE specific PUCCH initial power $P_{O\_UE\_PUCCH,c}$, a carrier and UE specific power offset $\Delta_{F\_PUCCH,c}(F)$ related to a PUCCH transmission format, and a carrier and UE specific power offset $\Delta_{TxD,c}(F')$ related to PUCCH transmission via two antenna ports, preconfigured by the network side through higher-layer signaling separately for each uplink carrier available for PUCCH transmission, where c represents a carrier index.

Here the UCI includes one or more of ACK/NACK, periodical CSI, and an SR.

Here in FIG. 8, a bus architecture can include any number of interconnection buses and bridges which are particularly configured to link various circuits together including one or more processor represented by the processor 800, and a memory represented by a memory 820. The bus architecture can link various other circuits together, e.g., peripheral devices, a voltage regulator, a power management circuit, etc., all of which are well known in the art, so a repeated description thereof will be omitted here. A bus interface provides an interface. The transceiver 810 can include a plurality of elements including a transmitter and a receiver configured to provide elements communicating with other various apparatuses over a transmission medium. For a different user equipment, a user interface 830 can also be an interface capable of connecting a required device externally or internally, where the connected device can include but will not be limited to a keypad, a display, a speaker, a microphone, a joy stick, etc.

The processor 800 is responsible of managing the bus architecture and of normal processes, and the memory 820 can store data used by the processor 800 in operation.

The embodiments of the invention provide a method and device for controlling PUCCH power, where a UE is configured with a plurality of sets of carriers, and each set of carriers corresponds to one specified uplink carrier used to transmit UCI via a PUCCH, so that when UCI is transmitted via PUCCHs on the specified uplink carriers corresponding to the different sets of carriers, power of each PUCCH is controlled based upon power control parameters corresponding to the uplink carrier for PUCCH transmission and at least one TPC command received on the corresponding set of carriers, that is, when the UE supports transmission of PUCCHs on different uplink carriers corresponding to different sets of carriers, the UE determines one or more uplink carriers for PUCCH transmission in a current uplink subframe, and determines a power adjustment cumulative amount corresponding to a PUCCH transmitted on each of the one or more uplink carriers for PUCCH transmission in the current uplink subframe, based upon at least one TPC command received on at least one downlink carrier among at least one set of carriers for which UCI is to be transmitted via the PUCCH on the each of the one or more uplink carriers in the current uplink subframe; and determines transmit power of the PUCCH to be transmitted on the each of the one or more uplink carriers for PUCCH transmission in the current uplink subframe based upon PUCCH power control parameters corresponding to the each of the one or more uplink carriers, and the power adjustment cumulative amount corresponding to the each of the one or more uplink carriers, to thereby control PUCCH power.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for controlling Physical Uplink Control Channel (PUCCH) power, the method comprising:

determining, by a User Equipment (UE), one or more uplink carriers for PUCCH transmission in a current uplink subframe, wherein the one or more uplink carriers are at least one of uplink carriers used to transmit Uplink Control Information (UCI) via PUCCHs for respective sets of carriers of the UE, each set of carriers of the UE corresponds to one of the uplink carriers used to transmit UCI, and the uplink carriers used to transmit UCI corresponding to different sets of carriers are different from each other;

determining, by the UE, a power adjustment cumulative amount corresponding to a PUCCH to be transmitted on each of the one or more uplink carriers for PUCCH transmission in the current uplink subframe, based upon at least one Transmission Power Control (TPC) command received on at least one downlink carrier among at least one set of carriers for which UCI is to be transmitted via the PUCCH on the each of the one or more uplink carriers in the current uplink subframe; and determining, by the UE, transmit power of the PUCCH to be transmitted on the each of the one or more uplink carriers for PUCCH transmission in the current uplink subframe, based upon PUCCH power control parameters corresponding to the each of the one or more uplink carriers and the power adjustment cumulative amount corresponding to the each of the one or more uplink carriers;

wherein determining, by the UE, the power adjustment cumulative amount corresponding to the PUCCH to be transmitted on the each of one or more uplink carriers for PUCCH transmission in the current uplink subframe, based upon the at least one TPC command received on the at least one downlink carrier among the at least one set of carriers for which UCI is to be transmitted via the PUCCH on the each of the one or more uplink carriers in the current uplink subframe comprises:

determining, by the UE, that the power adjustment cumulative amount $g(i)$ corresponding to the PUCCH to be transmitted on the each of the one or more uplink carriers in the current uplink subframe i is the sum of power adjustment amounts $\delta_{PUCCH}$ respectively indicated by Physical Downlink Control Channels (PDCCHs)/Enhanced Physical Downlink Control Channels (EPDCCHs) received, on the at least one downlink carrier among the at least one set of carriers, in M downlink subframes of the at least one set of carriers and a power adjustment cumulative amount $g(i-1)$ corresponding to a PUCCH on the each of the one or more uplink carriers in a uplink subframe preceding the current uplink subframe, wherein the power adjustment amounts are $\delta_{PUCCH}$ are indicated respectively by TPC commands carried in the PDCCHs/EPDCCHs, and M represents the number of downlink subframes, in each set of the at least one set of carriers for which UCI is to be transmitted via the PUCCH on the each of the one or more uplink carriers, for which Acknowledgement/Non-Acknowledgement (ACK/NACK) of downlink data needs to be fed back in the current uplink subframe i.

2. The method according to claim 1, wherein before the UE determines the one or more uplink carriers for PUCCH transmission in the current uplink subframe, the method further comprises:
   determining, by the UE, that N configured carriers of the UE are grouped into A sets of carriers and determining the uplink carriers used to transmit UCI via PUCCHs for the respective sets of carriers, according to a received configuration information transmitted by the network side or as predefined with the network side, wherein 1≤A≤N, and each set of carriers comprises at least one carrier.

3. The method according to claim 1, wherein the power adjustment amounts $\delta_{PUCCH}$ respectively indicated by the PDCCHs/EPDCCHs received by the UE, on the at least one downlink carrier among the at least one set of carriers, in the M downlink subframes of the at least one set of carriers comprise:
   power adjustment amounts $\delta_{PUCCH}$ respectively indicated by PDCCHs/EPDCCHs received by the UE, on one downlink carrier dedicated in one set of carriers for which UCI is to be transmitted via the PUCCH on the each of the one or more uplink carriers, in M downlink subframes of the set of carriers; or
   power adjustment amounts $\delta_{PUCCH}$ respectively indicated by PDCCHs/EPDCCHs received by the UE, on any one downlink carrier among one set of carriers for which UCI is to be transmitted via the PUCCH on the each of the one or more uplink carriers, in M downlink subframes of the one set of carriers; or
   power adjustment amounts $\delta_{PUCCH}$ respectively indicated by PDCCHs/EPDCCHs received by the UE, on all downlink carriers of one set of carriers for which UCI is to be transmitted via the PUCCH on the each of the one or more uplink carriers, in M downlink subframes of the one set of carriers; or
   power adjustment amounts $\delta_{PUCCH}$ respectively indicated by PDCCHs/EPDCCHs received by the UE, on one downlink carrier dedicated in one set of carriers determined among a plurality of sets of carriers for which UCI is to be transmitted via the PUCCH on the each of the one or more uplink carriers, in M downlink subframes of the determined one set of carriers; or
   power adjustment amounts $\delta_{PUCCH}$ respectively indicated by PDCCHs/EPDCCHs received by the UE, on any one downlink carrier among one set of carriers determined among a plurality of sets of carriers for which UCI is to be transmitted via the PUCCH on the each of the one or more uplink carriers, in M downlink subframes of the determined one set of carriers; or
   power adjustment amounts $\delta_{PUCCH}$ respectively indicated by PDCCHs/EPDCCHs received by the UE, on all downlink carriers of one set of carriers determined among a plurality of sets of carriers for which UCI is to be transmitted via the PUCCH on the each of the one or more uplink carriers, in M downlink subframes of the determined one set of carriers; or
   power adjustment amounts $\delta_{PUCCH}$ respectively indicated by PDCCHs/EPDCCHs received by the UE, on one downlink carrier dedicated in each of a plurality of sets of carriers for which UCI is to be transmitted via the PUCCH on the each of the one or more uplink carriers, in M downlink subframes of the each of the plurality of sets of carriers; or
   power adjustment amounts $\delta_{PUCCH}$ respectively indicated by PDCCHs/EPDCCHs received by the UE, on any one downlink carrier among each of a plurality of sets of carriers for which UCI is to be transmitted via the PUCCH on the each of the one or more uplink carriers, in M downlink subframes of the each of the plurality of sets of carriers; or
   power adjustment amounts $\delta_{PUCCH}$ respectively indicated by PDCCHs/EPDCCHs received by the UE, on any one downlink carrier among a plurality of sets of carriers for which UCI is to be transmitted via the PUCCH on the each of the one or more uplink carriers, in M downlink subframes of the plurality of sets of carriers; or
   power adjustment amounts $\delta_{PUCCH}$ respectively indicated by PDCCHs/EPDCCHs received by the UE, on all downlink carriers of each of a plurality of sets of carriers for which UCI is to be transmitted via the PUCCH on the each of the one or more uplink carriers, in M downlink subframes of the each of the plurality of sets of carriers.

4. The method according to claim 3, wherein the dedicated one downlink carrier is:
   such a downlink carrier among the one set of carriers that is paired with the each of the one or more uplink carriers.

5. The method according to claim 1, wherein each of the PDCCHs/EPDCCHs is a PDCCH/EPDCCH in which a TPC field is not reused to indicate ACK/NACK resource.

6. The method according to claim 5, wherein for the UE configured to transmit ACK/NACK using the PUCCH format 3, each of the PDCCHs/EPDCCHs is:
   a PDCCH/EPDCCH transmitted on a Primary Component Carrier (PCC), and Downlink Assignments Index (DAI) value in the PDCCH/EPDCCH is equal to '1'; or
   a PDCCH/EPDCCH used to schedule the PCC, and the DAI value in the PDCCH/EPDCCH is equal to '1'; or
   a PDCCH/EPDCCH transmitted on a downlink carrier, paired with the each of the one or more uplink carriers, in each of the at least one set of carriers, and the DAI value in the PDCCH/EPDCCH is equal to '1'; or
   a PDCCH/EPDCCH used to schedule a downlink carrier, paired with the each of the one or more uplink carriers, in each of the at least one set of carriers, and the DAI value in the PDCCH/EPDCCH is equal to '1'; and
   for the UE configured to transmit ACK/NACK using the PUCCH format 1b with channel selection, each of the PDCCHs/EPDCCHs is:
   a PDCCH/EPDCCH transmitted on a PCC; or
   a PDCCH/EPDCCH transmitted on a downlink carrier, paired with the each of the one or more uplink carriers, in each of the at least one set of carriers.

7. The method according to claim 1, wherein the PUCCH power control parameters are:
   carrier specific parameters preconfigured by the network side through higher-layer signaling separately for each uplink carrier available for PUCCH transmission.

8. The method according to claim 7, wherein the PUCCH power control parameters comprise:
   a carrier specific PUCCH initial power $P_{O\_NOMINAL\_PUCCH,c}$, a carrier and UE specific PUCCH initial power $P_{O\_UE\_PUCCH,c}$, a carrier and UE specific power offset $\Delta_{F\_PUCCH,c}(F)$ related to a PUCCH transmission format, and a carrier and UE specific power offset $\Delta_{TxD,c}(F')$ related to PUCCH transmission via two antenna ports, preconfigured by the network side through higher-layer signaling separately for each uplink carrier available for PUCCH transmission, wherein c represents a carrier index.

9. The method according to claim 1, wherein the UCI comprises one or more of ACK/NACK, periodic Channel State Information (CSI), and Scheduling Request (SR).

10. A device for controlling Physical Uplink Control Channel (PUCCH) power, the device comprising:
an uplink carrier determining unit, configured to determine one or more uplink carriers for PUCCH transmission in a current uplink subframe, wherein the one or more uplink carriers are at least one of uplink carriers used to transmit Uplink Control Information (UCI) via PUCCHs for respective sets of carriers of a UE, each set of carriers of the UE corresponds to one of the uplink carriers used to transmit UCI, and the uplink carriers used to transmit UCI corresponding to different sets of carriers are different from each other;
a power adjustment cumulative amount determining unit, configured to determine a power adjustment cumulative amount corresponding to the PUCCH to be transmitted on each of one or more uplink carriers for PUCCH transmission in the current uplink subframe, based upon at least one TPC command received on at least one downlink carrier among at least one set of carriers for which UCI is to be transmitted via the PUCCH on the each of one or more uplink carriers in the current uplink subframe; and
a transmit power determining unit configured to determine transmit power of the PUCCH to be transmitted on the each of the one or more uplink carriers for PUCCH transmission in the current uplink subframe, based upon PUCCH power control parameters corresponding to the each of the one or more uplink carriers and the power adjustment cumulative amount corresponding to the each of the one or more uplink carriers;
wherein the power adjustment cumulative amount determining unit, configured to determine the power adjustment cumulative amount corresponding to the PUCCH to be transmitted on the each of the one or more uplink carriers for PUCCH transmission in the current uplink subframe, based upon the at least one TPC command received on the at least one downlink carrier among the at least one set of carriers for which UCI is to be transmitted via the PUCCH on the each of the one or more uplink carriers in the current uplink subframe, is configured
to determine that the power adjustment cumulative amount g(i) corresponding to the PUCCH to be transmitted on the each of the one or more uplink carriers in the current uplink subframe i is the sum of power adjustment amounts $\delta_{PUCCH}$ respectively indicated by PDCCHs/EPDCCHs received, on the at least one downlink carrier among the at least one set of carriers, in M downlink subframes of the at least one set of carriers and a power adjustment cumulative amount g (i−1) corresponding to a PUCCH on the each of the one or more uplink carriers in a uplink subframe preceding the current uplink subframe, wherein the power adjustment amounts $\delta_{PUCCH}$ are indicated respectively by TPC commands carried in the PDCCHs/EPDCCHs, and M represents the number of downlink subframes, in each set of the at least one set of carriers for which UCI is to be transmitted via the PUCCH on the each of the one or more uplink carriers, for which ACK/NACK of downlink data needs to be fed back in the current uplink subframe i.

11. The device according to claim 10, wherein the uplink carrier determining unit is further configured:
before the one or more uplink carriers for PUCCH transmission in the current uplink subframe are determined, to determine that N configured carriers for the UE are grouped into A sets of carriers and to determine the uplink carriers used to transmit UCI via PUCCHs for the respective sets of carriers according to a received configuration information transmitted by the network side or as predefined with the network side, wherein 1≤A≤N, and each set of carriers comprises at least one carrier.

12. The device according to claim 10, wherein the power adjustment amounts $\delta_{PUCCH}$ respectively indicated by the PDCCHs/EPDCCHs received on the at least one downlink carrier among the at least one set of carriers in the M downlink subframes of the at least one set of carriers comprise:
power adjustment amounts $\delta_{PUCCH}$ respectively indicated by PDCCHs/EPDCCHs received, on one downlink carrier dedicated in one set of carriers for which UCI is to be transmitted via the PUCCH on the each of the one or more uplink carriers, in M downlink subframes of the set of carriers; or
power adjustment amounts $\delta_{PUCCH}$ respectively indicated by PDCCHs/EPDCCHs received, on any one downlink carrier among one set of carriers for which UCI is to be transmitted via the PUCCH on the each of the one or more uplink carriers, in M downlink subframes of the one set of carriers; or
power adjustment amounts $\delta_{PUCCH}$ respectively indicated by PDCCHs/EPDCCHs received, on all downlink carriers of one set of carriers for which UCI is to be transmitted via the PUCCH on the each of the one or more uplink carriers, in M downlink subframes of the one set of carriers; or
power adjustment amounts $\delta_{PUCCH}$ respectively indicated by PDCCHs/EPDCCHs received, on one downlink carrier dedicated in one set of carriers determined among a plurality of sets of carriers for which UCI is to be transmitted via the PUCCH on the each of the one or more uplink carriers, in M downlink subframes of the determined set of carriers; or
power adjustment amounts $\delta_{PUCCH}$ respectively indicated by PDCCHs/EPDCCHs received, on any one downlink carrier among one set of carriers determined among a plurality of sets of carriers for which UCI is to be transmitted via the PUCCH on the each of the one or more uplink carriers, in M downlink subframes of the determined one set of carriers; or
power adjustment amounts $\delta_{PUCCH}$ respectively indicated by PDCCHs/EPDCCHs received, on all downlink carriers of one set of carriers determined among a plurality of sets of carriers for which UCI is to be transmitted via the PUCCH on the each of the one or more uplink carriers, in M downlink subframes of the determined one set of carriers; or
power adjustment amounts $\delta_{PUCCH}$ respectively indicated by PDCCHs/EPDCCHs received, on one downlink carrier dedicated in each of a plurality of sets of carriers for which UCI is to be transmitted via the PUCCH on the each of the one or more uplink carriers, in M downlink subframes of the each of the plurality of sets of carriers; or power adjustment amounts $\delta_{PUCCH}$ respectively indicated by PDCCHs/EPDCCHs received, on any one downlink carrier among each of a plurality of sets of carriers for which UCI is to be transmitted via the PUCCH on the each of the one or more uplink carriers, in M downlink subframes of the each of the plurality sets of carriers; or power adjustment amounts $\delta_{PUCCH}$ respectively indicated by PDCCHs/EPDCCHs received, on any one downlink carrier among a plurality of sets of carriers for which UCI is to be transmitted via the PUCCH on the each of the one or more uplink carriers, in M downlink subframes of the plurality of sets of carriers; or power adjustment amounts $\delta_{PUCCH}$ respectively indicated by PDCCHs/EPDCCHs received, on all downlink carriers of each of a plurality of sets of carriers for which UCI is to be transmitted via the PUCCH on the each of the one or more uplink carriers, in M downlink subframes of the each of the plurality of sets of carriers.

13. The device according to claim 12, wherein the power adjustment cumulative amount is further configured:
    to determine the dedicated one downlink carrier as such a downlink carrier among the one set of carriers that is paired with the each of the one or more uplink carriers.

14. The device according to claim 10, wherein the power adjustment cumulative amount is further configured:
    to determine the each of the PDCCHs/EPDCCHs is a PDCCH/EPDCCH in which a TPC field is not reused to indicate ACK/NACK resource.

15. The device according to claim 14, wherein for the UE configured to transmit ACK/NACK in the PUCCH format 3, the power adjustment cumulative amount is further configured:
    to determine the each of the PDCCHs/EPDCCHs as:
    a PDCCH/EPDCCH transmitted on a Primary Component Carrier (PCC), and Downlink Assignments Index (DAI) value in the PDCCH/EPDCCH is equal to '1'; or
    a PDCCH/EPDCCH used to schedule the PCC, and the DAI value in the PDCCH/EPDCCH is equal to '1'; or
    a PDCCH/EPDCCH transmitted on a downlink carrier, paired with the each of the one or more uplink carriers, in each of the at least one set of carriers, and the DAI value in the PDCCH/EPDCCH is equal to '1'; or
    a PDCCH/EPDCCH used to schedule a downlink carrier, paired with the each of the one or more uplink carriers, in each of the at least one set of carriers, and the DAI value in the PDCCH/EPDCCH is equal to '1'; and
    for the UE configured to transmit ACK/NACK using the PUCCH format 1b with channel selection, the power adjustment cumulative amount is further configured:
    to determine the each of the PDCCHs/EPDCCHs as:
    a PDCCH/EPDCCH transmitted on a PCC; or
    a PDCCH/EPDCCH transmitted on a downlink carrier, paired with the each of the one or more uplink carriers, in each of the at least one set of carriers.

16. The device according to claim 10, wherein the transmit power determining unit is further configured:
    to obtain the PUCCH power control parameters which are carrier specific parameters preconfigured by the network side through higher-layer signaling separately for each uplink carrier available for PUCCH transmission.

17. The device according to claim 16, wherein the transmit power determining unit configured to obtain the PUCCH power control parameters is configured:
    to obtain the following PUCCH power control parameters:
    a carrier specific PUCCH initial power $P_{O\_NOMINAL\_PUCCH,c}$, a carrier and UE specific PUCCH initial power $P_{O\_UE\_PUCCH,c}$, a carrier and UE specific power offset $\Delta_{F\_PUCCH,c}(F)$ related to a PUCCH transmission format, and a carrier and UE specific power offset $\Delta_{TxD,c}(F')$ related to PUCCH transmission via two antenna ports, preconfigured by the network side through higher-layer signaling separately for each uplink carrier available for PUCCH transmission, wherein c represents a carrier index.

18. The device according to claim 10, wherein the UCI comprises one or more of ACK/NACK, periodical CSI, and an SR.

* * * * *